(12) United States Patent
Chen et al.

(10) Patent No.: US 11,875,773 B2
(45) Date of Patent: Jan. 16, 2024

(54) FAN CONTROL SYSTEM AND METHOD FOR NOISE CANCELLATION

(71) Applicant: British Cayman Islands Intelligo Technology Inc., Grand Cayman (KY)

(72) Inventors: Ting-Yao Chen, Zhubei (TW); Chen-Chu Hsu, Zhubei (TW); Tsung-Liang Chen, Zhubei (TW)

(73) Assignee: BRITISH CAYMAN ISLANDS INTELLIGO TECHNOLOGY INC., Grand Cayman (KY)

( * ) Notice: Subject to any disclaimer, the term of this patent is extended or adjusted under 35 U.S.C. 154(b) by 15 days.

(21) Appl. No.: 17/737,501

(22) Filed: May 5, 2022

(65) Prior Publication Data

US 2022/0383847 A1    Dec. 1, 2022

Related U.S. Application Data

(60) Provisional application No. 63/192,566, filed on May 25, 2021.

(51) Int. Cl.
*G10K 11/178* (2006.01)
*G05D 19/02* (2006.01)

(52) U.S. Cl.
CPC ....... *G10K 11/17854* (2018.01); *G05D 19/02* (2013.01); *G10K 11/17823* (2018.01); *G10K 11/17825* (2018.01); *G10K 11/17881* (2018.01); *G10K 2210/109* (2013.01); *G10K 2210/11* (2013.01); *G10K 2210/112* (2013.01); *G10K 2210/3026* (2013.01); *G10K 2210/3027* (2013.01); *G10K 2210/3028* (2013.01); *G10K 2210/3038* (2013.01); *G10K 2210/3043* (2013.01); *G10K 2210/3044* (2013.01); *G10K 2210/3046* (2013.01); *G10K 2210/3051* (2013.01)

(58) Field of Classification Search
CPC ..................... G10K 2210/109; G10K 2210/11
See application file for complete search history.

(56) References Cited

U.S. PATENT DOCUMENTS

2023/0071695 A1* 3/2023 Chang .............. G10K 11/17823

OTHER PUBLICATIONS

Hansen et al., "Active Control of Noise and Vibration," Second Edition, vol. 1, 2012, pp. 697-700.

* cited by examiner

*Primary Examiner* — Ping Lee
(74) *Attorney, Agent, or Firm* — MUNCY, GEISSLER, OLDS & LOWE, PC

(57) ABSTRACT

A fan control system applied to N fans inside a computer system is disclosed, comprising: a main microphone, a control circuitry, a wave generation circuitry and a number N of fan controllers. The control circuitry calculates a basic frequency value according to a temperature inside the computer system, and continuously updates a parameter by any known optimization algorithm according to a main audio signal from the main microphone. The wave generation circuitry generates N square waves according to the basic frequency value and the parameter. The N fan controllers respectively form and transmit N modulation signals to the N fans according to the N square waves and N tachometric signals from the N fans. The parameter is one of a frequency variation and a set of phase differences, and the N square waves have the same frequency.

39 Claims, 20 Drawing Sheets

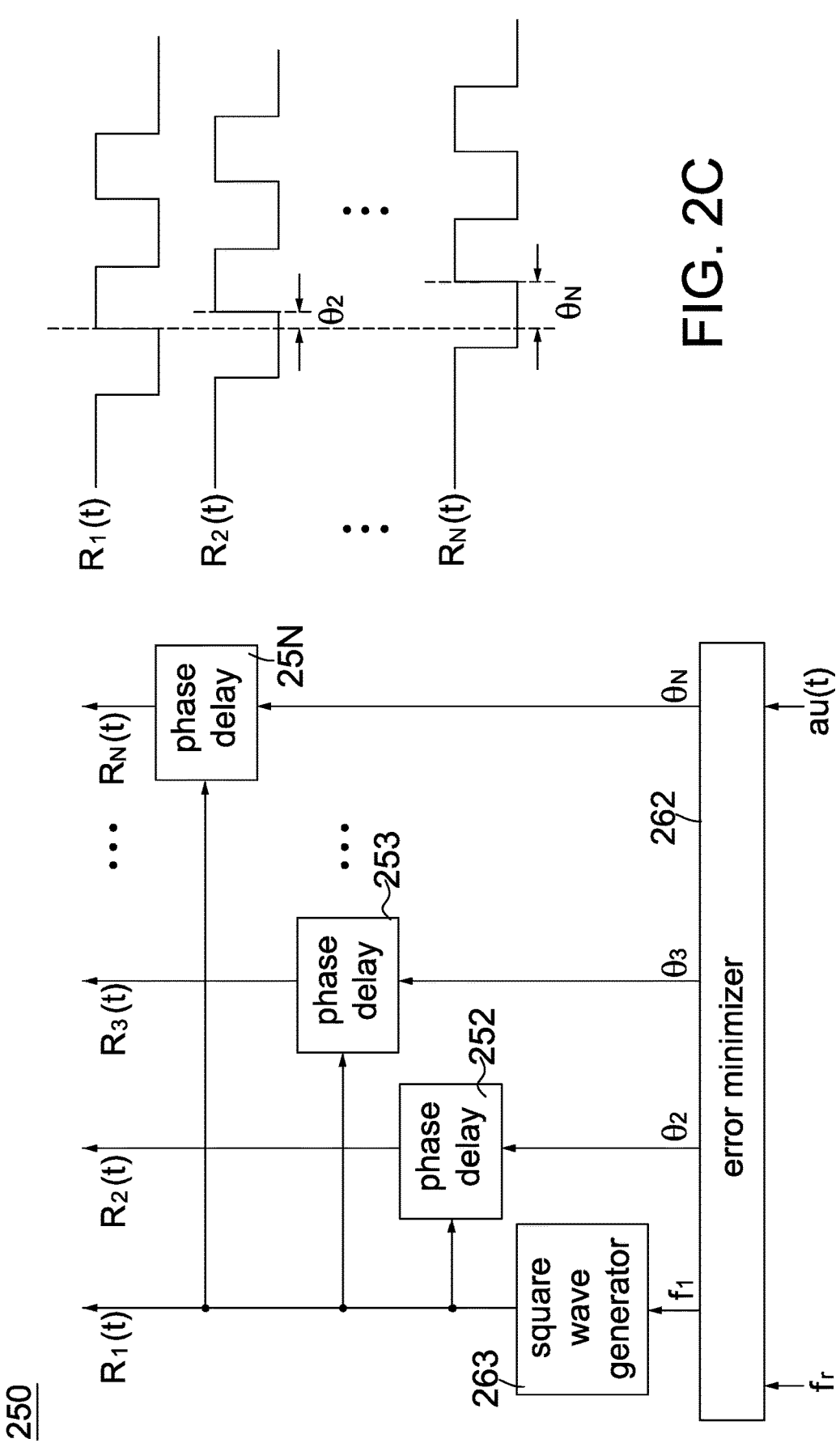

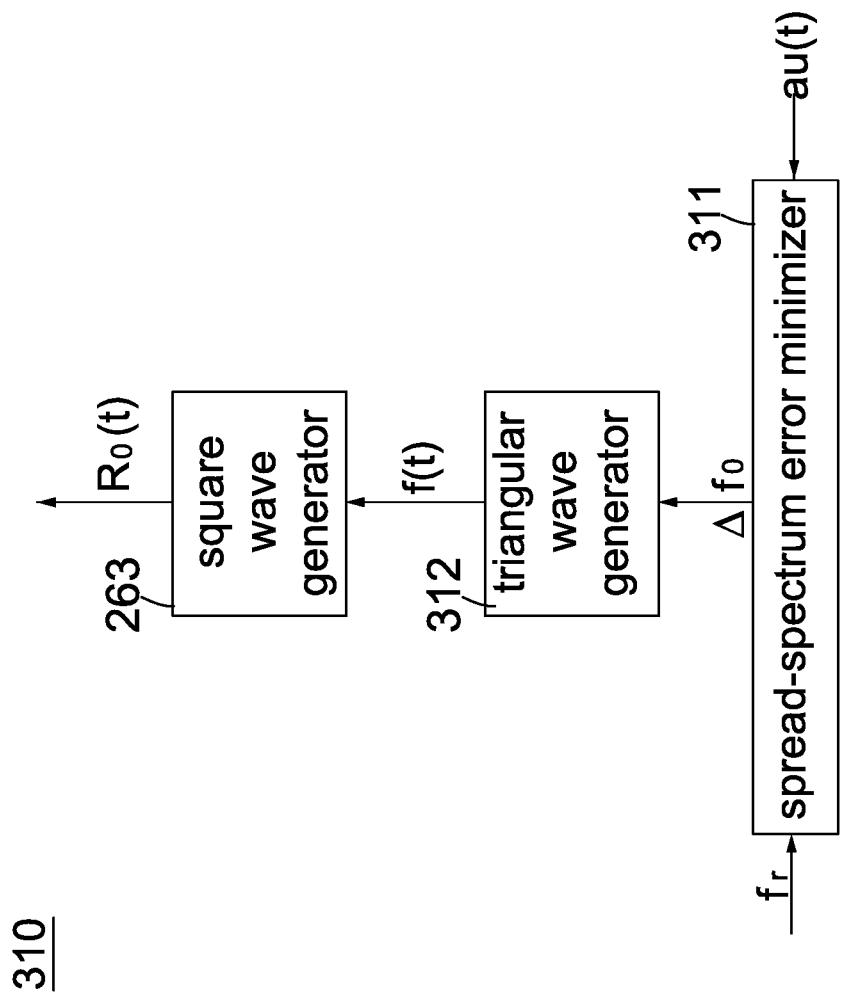

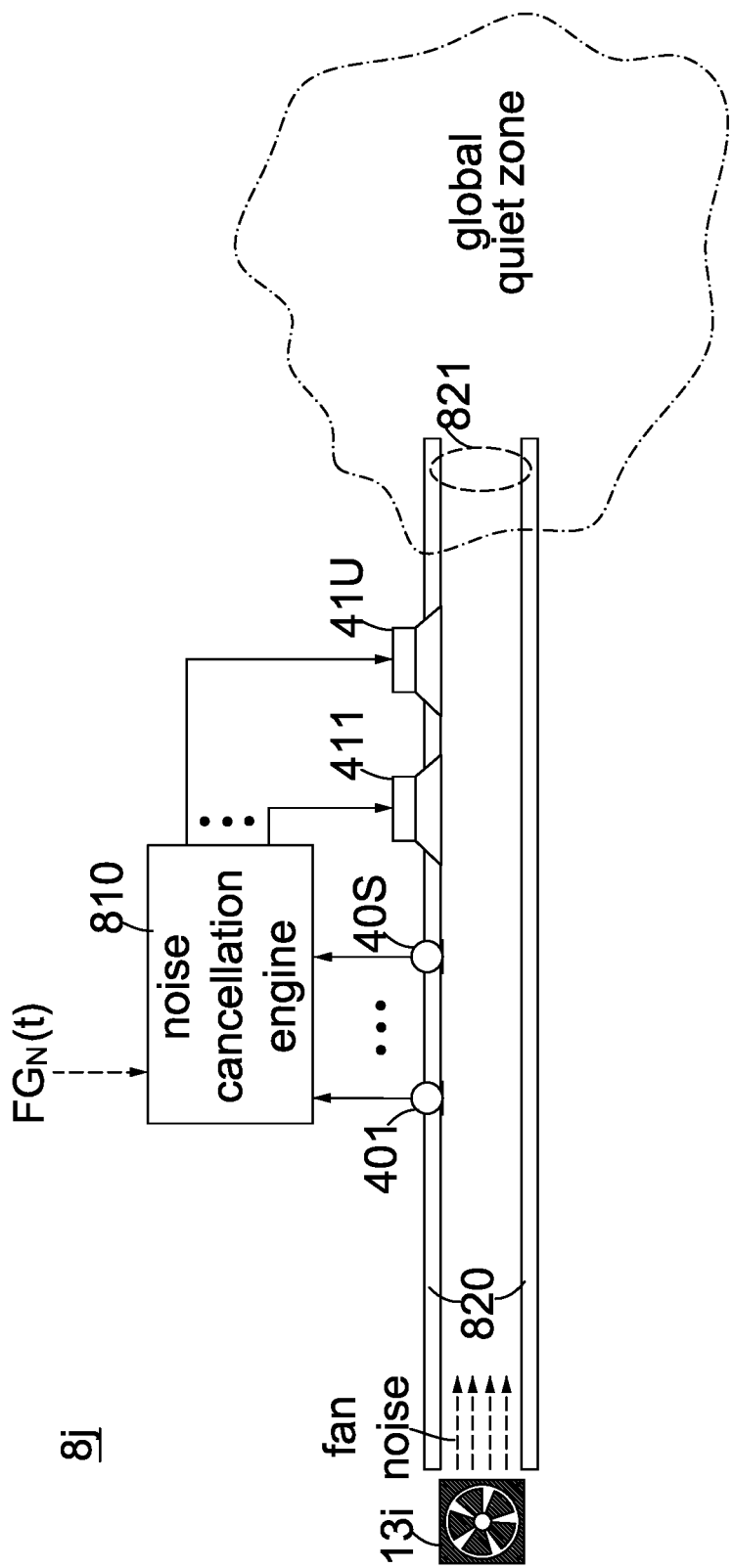

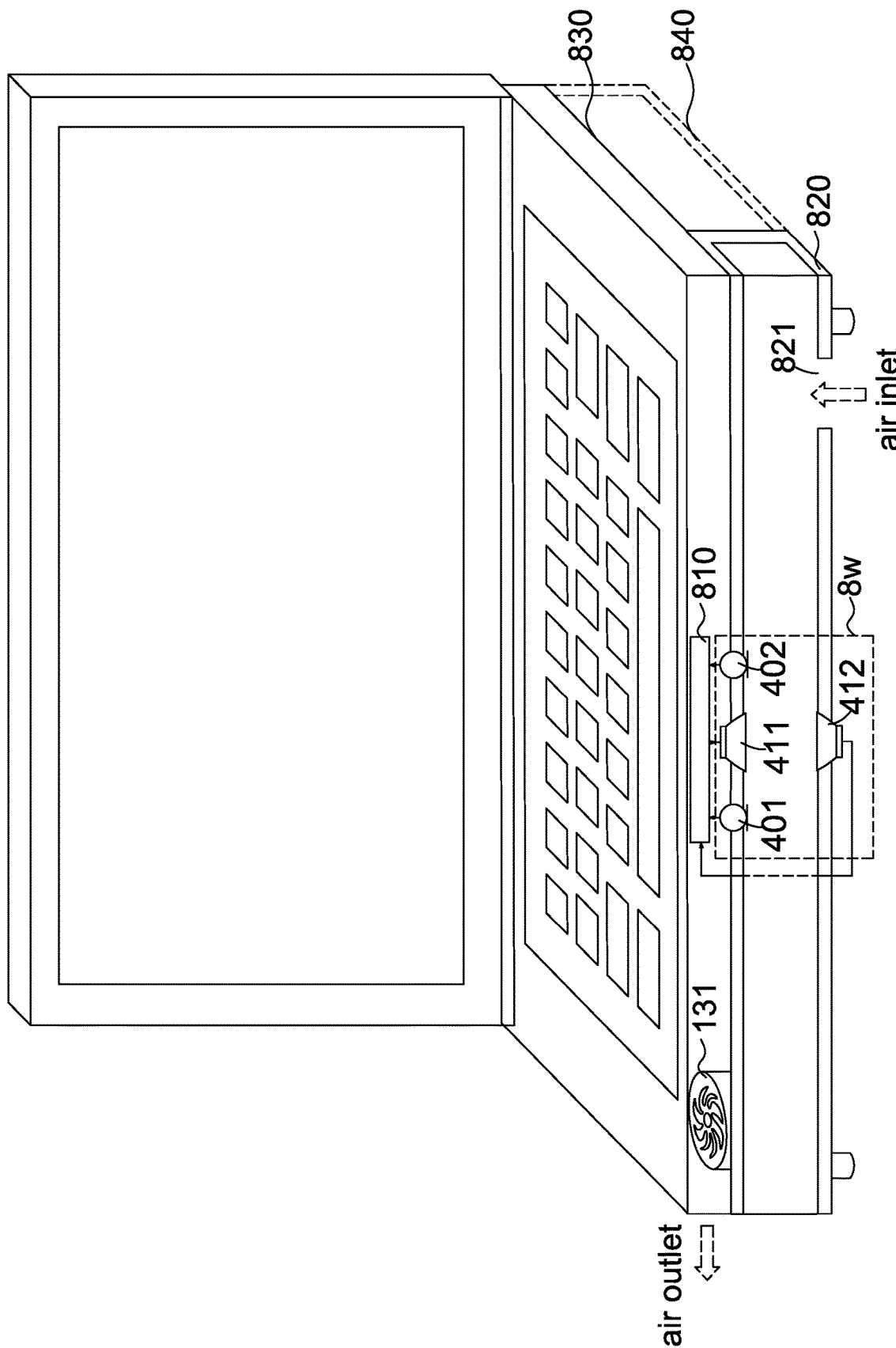

FAN CONTROL SYSTEM AND METHOD FOR NOISE CANCELLATION

CROSS-REFERENCE TO RELATED APPLICATION

This application claims priority under 35 USC 119(e) to U.S. provisional application No. 63/192,566, filed on May 25, 2021, the content of which is incorporated herein by reference in its entirety.

BACKGROUND OF THE INVENTION

Field of the Invention

The invention relates to noise cancellation, and more particularly, to a fan control system and method for noise cancellation.

Description of the Related Art

In various electronic products such as PCs, laptops and graphic cards, cooling fans are often used to dissipate heat. The cooling fans are a major noise source in the electronic products. What is needed is a fan control system and method capable of reducing fan noise.

SUMMARY OF THE INVENTION

In view of the above-mentioned problems, an object of the invention is to provide a fan control system capable of reducing a total fan acoustic noise power picked up by a main microphone and improving the performance of active noise cancellation (ANC).

One embodiment of the invention provides a fan control system for N fans inside a computer system. The fan control system comprises a main microphone, a control circuitry, a wave generation circuitry and a number N of fan controllers. The control circuitry is coupled to the main microphone and configured to calculate a basic frequency value according to a temperature inside the computer system, and continuously update a parameter by any known optimization algorithm according to a main audio signal from the main microphone. The wave generation circuitry generates N square waves according to the basic frequency value and the parameter. The N fan controllers, coupled between the wave generation circuitry and the N fans, forms and transmits N modulation signals to the N fans according to the N square waves and N tachometric signals from the N fans. The parameter is one of a frequency variation and a set of phase differences, and the N square waves have the same frequency.

Another embodiment of the invention provides a fan control method for N fans inside a computer system. The method comprises: calculating a basic frequency value according to a temperature inside the computer system; continuously updating a parameter by any known optimization algorithm according to a main audio signal from a main microphone; generating N square waves according to the basic frequency value and the parameter; and, forming and transmitting N modulation signals to the N fans according to the N square waves and N tachometric signals from the N fans. The parameter is one of a frequency variation and a set of phase differences, and the N square waves have the same frequency.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2B is a block diagram showing MFMC module 250 according to an embodiment of the invention.

FIG. 2C is a diagram showing each speed signal $R_i(t)$ has a phase difference $\theta_i$ with respect to the speed signal $R_1(t)$, for i=2~N.

FIG. 3D is a block diagram of SSC module 310 according to an embodiment of the invention.

FIG. 8A is a block diagram of a noise cancellation system according to an embodiment of the invention.

FIG. 8D is an exemplary diagram showing a position relationship among an air duct 820, a fan 131, a noise cancellation engine 810, a reference microphone 401, an error microphone 402, and two speakers 411~412 within a notebook with s1=s2=1 and U=2.

DETAILED DESCRIPTION OF THE INVENTION

Figure 1:
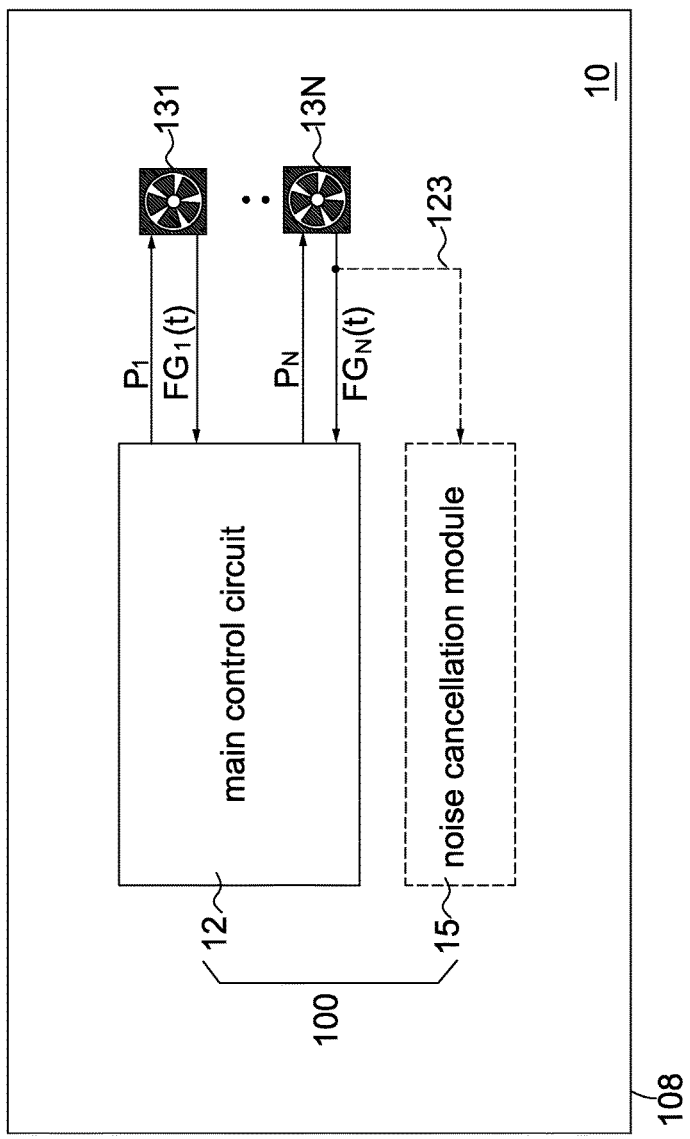
FIG. 1 is a block diagram of a fan control system according to the invention.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

A feature of the invention is to apply speed signal control to cooling fans inside a computer system to reduce a total fan acoustic noise power picked up by a main microphone 210 and improve the performance of noise cancellation/suppression. The speed signal control includes: (1) adjusting multiple signal phases of multiple synchronous speed signals $(R_1(t)$~$R_N(t))$ in FIG. 2C for the cooling fans; and (2) adjusting a frequency variation Δ for a signal frequency f(t) (e.g., spreading the signal frequency f(t) in FIG. 3B) of one single speed signal $R_0(t)$ for the cooling fans. Another feature of the invention is that features "correlation to IRP" and "noise periodicity" for noise waveforms (that are CA sequences) (will be described below) are used to constitute a solid base for the following active noise cancellation (ANC) operation.

FIG. 1 is a block diagram of a fan control system according to the invention. Referring to FIG. 1, a fan control system 100 of the invention is applied to N cooling fans 131~13N inside a computer system 10. The N cooling fans 131~13N operate to reduce the internal temperature inside an enclosure 108 of the computer system 10. The fan control system 100 includes a main control circuit 12 and a noise cancellation module 15, where N>=1. The main control circuit 12 is configured to generate N pulse-width modulation (PWM) signals $P_1$~$P_N$ to the N fans 131~13N according to N tachometric ("tach") signals $FG_1(t)$~$FG_N(t)$ and the internal temperature measured inside the enclosure 108. The noise cancellation module 15 is configured to cancel/suppress the fan noise. The computer system 10, such as a PC, a notebook, a laptop, or a server, includes the enclosure (or chassis) 108, in which the fan control system 100, the fans 131~13N and other electronic components (e.g., central processing units (CPUs), microprocessors, power supplies, graphics processing unit, chipsets, memory, hard disk drives, CD or DVD drives, and the like) (not shown) reside. The other electronic components generate heat during operation. The internal temperature inside the enclosure 108 is reduced by operating the cooling fans 131~13N via the fan control system 100.

The main control circuit 12 is capable of operating independently without the noise cancellation module 15. However, with one of the noise cancellation modules 15A~15D, the performance of noise cancellation for the fan control system 100 would be further improved. Please note that the noise cancellation module 15 may operate without receiving any tach signals $FG_1(t)$~$FG_N(t)$, and thus the signal line 123 is represented as a dash-line FIG. 1. In other words, the main control circuit 12 and the noise cancellation module 15 may operate simultaneously and independently. Please also note that the noise cancellation modules 15/15B/15C and the noise cancellation system 8j operating with the tach signal $FG_N(t)$ in FIGS. 1, 5A, 6 and 8A are provided by way of example and not limitations of the invention. In actual implementation, the noise cancellation modules 15/15B/15C and the noise cancellation system 8j may operate with any tach signal $FG_i(t)$, for i=1~N.

Figure 2A:
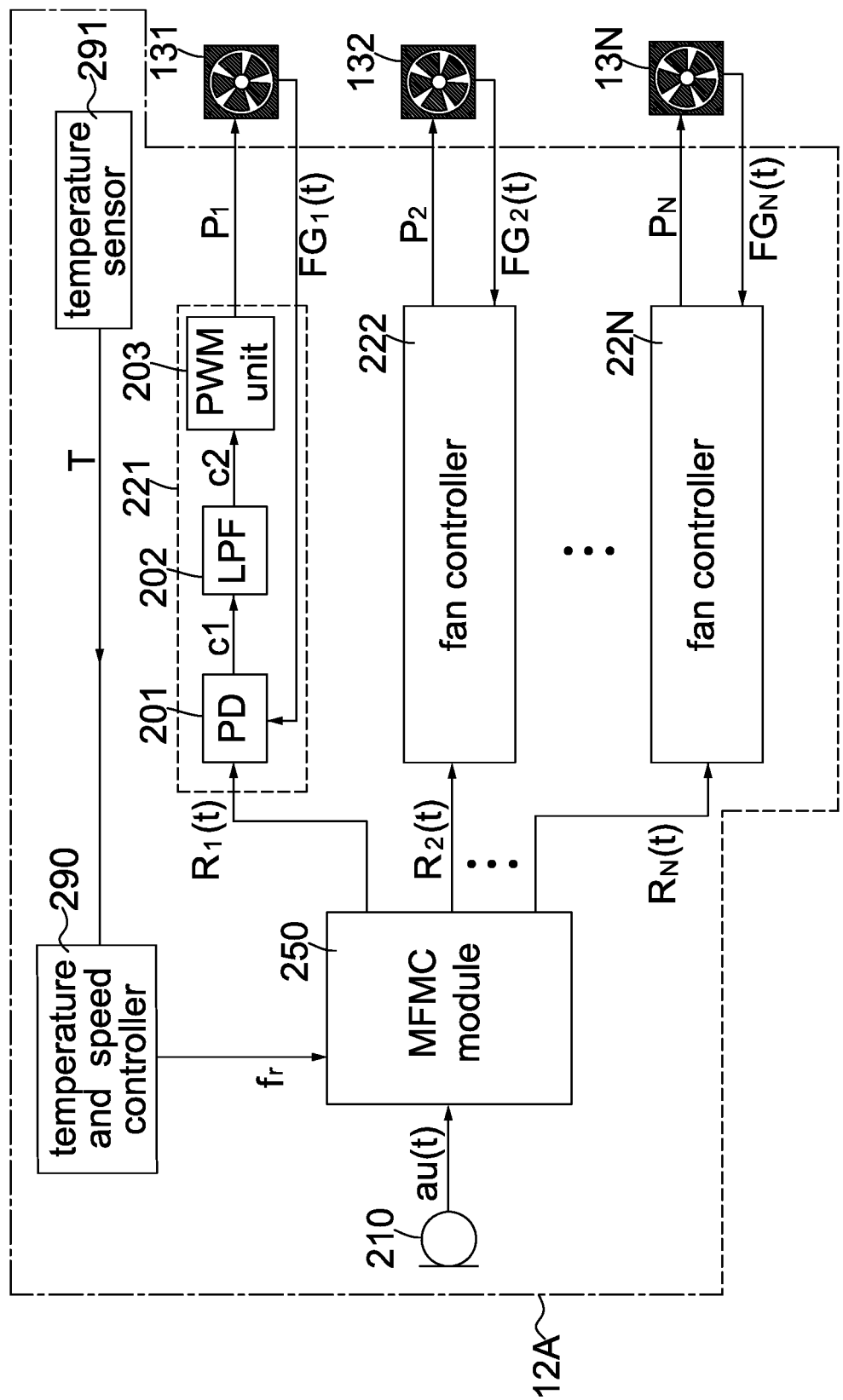
FIG. 2A is a block diagram of a main control circuit according to one embodiment of the invention.

FIG. 2A is a block diagram of a main control circuit according to one embodiment of the invention. Referring to FIG. 2A, a main control circuit 12A, includes a main microphone 210, a multiple-fan mutual cancellation (MFMC) module 250, a temperature and speed controller 290, a temperature sensor 291 and N fan controllers 221~22N, where N>=2. The main microphone 210 receives the ambient sound, such as fan noise, to generates an audio signal au(t). The temperature sensor 291 measures the internal temperature inside the enclosure 108 of the computer system 10 and converts it into a digital value T. The temperature and speed controller 290 receives the digital value T and outputs a corresponding reference rotational speed value fr according to a pre-configured lookup table defining the mapping between the temperature values and the reference rotational speed values of the fan shaft. In general, the reference rotational speed value fr increases as the digital value T increases to cool the inside of the enclosure 108. The temperature and speed controller 290 continually monitors the internal temperature and controls the fan rotational speed when the computer system 10 operates.

According to the reference rotational speed value fr and the audio signal au(t), the MFMC module 250 generates a frequency value performs phase tracking over a set of (N−1) phase values $θ_2$ to $θ_N$, and generates N speed signals, e.g., N square waves $R_1(t)$~$R_N(t)$ as shown in FIGS. 2B-2C. Each speed signal $R_i(t)$ with a signal frequency $f_i$ and a signal phase $θ_i$ indicates a desired rotational speed for (the fan shaft of) a corresponding fan 13i, for i=1~N. Each fan controller 22i receives a speed signal $R_i(t)$ and a tach signal $FG_i(t)$ to generate a PWM signal $P_i$. In an embodiment, each fan 13i is a 4-wire fan with a power terminal, a ground terminal, a tach output terminal for generating a tach signal $FG_i(t)$, and a PWM input terminal for receiving a PWM signal Pi. Please note that the 4-wire fan is provided by way of example, but not limitations of the invention. In actual implementations, any other number of wires in a fan can be used as long as the fan can generate a tach signal, and receive a PWM signal.

Each tach signal $FG_i(t)$ with a fan frequency and a fan phase indicates the actual rotational speed (of the fan shaft) of the corresponding fan 13i, for i=1~N. In this embodiment of FIGS. 2A-2C, the fans 131~13N are required to run synchronously, i.e., operating at the same rotational speed. Thus, N signal frequencies $f_1$~$f_N$ of the N speed signals $R_1(t)$~$R_N(t)$ would be the same, i.e., $f_1=f_2=\ldots=f_N$. The reference rotational speed value fr and the number of poles in motors of the fans 131~13N determine the N signal frequencies $f_1$~$f_N$. For example, for the fans with four-pole motors, the N signal frequencies $f_1$~$f_N$ are twice the reference rotational speed value fr, i.e., $f_i$=2×fr; for the fans with eight-pole motors, the N signal frequencies $f_1$~$f_N$ are four times the reference rotational speed value fr, i.e., $f_i$=4×fr, where i=1~N. Moreover, each speed signal $R_i(t)$ is required to have a phase difference $\theta_i$ with respect to the speed signal $R_1(t)$ as shown in FIG. 2C, for i=2~N. For ease of description, the following examples and embodiments are described with the assumption that the fans 131~13N have four-pole motors.

Each fan controller 22i includes a phase detector 201, a lowpass filter (LPF) 202 and a pulse width modulation (PWM) unit 203, for i=1~N. The phase detector 201 measures the phase difference between the square wave $R_i(t)$ and the tach signal $FG_i(t)$ to generate a phase difference signal c1 while the LPF 202 eliminates high-frequency components in the phase difference signal c1 to obtain a control signal c2. According to the control signal c2, the PWM unit 203 transmits the PWM signal $P_i$ with the corresponding width of pulses in a train of on-off pulses to control the rotational speed of its corresponding fan 13i, for i=1~N.

FIG. 2B is a block diagram showing MFMC module 250 according to an embodiment of the invention. Referring to FIG. 2B, the MFMC module 250 includes (N−1) phase delay blocks 252~25N, an error minimizer 262 and a square wave generator 263. After receiving the reference rotational speed value fr and the audio signal au(t), the error minimizer 262 transmits a signal frequency $f_1$(=2×fr) to the square wave generator 263 and then uses any known optimization algorithm (such as Gradient Descent) to find optimal values for a phase set $\theta_2$~$\theta_N$ to minimize the total fan acoustic noise power picked up by the main microphone 210. The square wave generator 263 receives the signal frequency $f_1$ to generate a square wave $R_1(t)$. The phase delay block 25i uses techniques well known in the art to delay the square wave $R_1(t)$ according to an optimum phase value $\theta_i$ to generate a phase-adjusted square wave $R_1(t)$, where i=2~N. In one embodiment, the total fan acoustic noise power (picked up by the microphone 210) is a function of the phase set $\theta_2$~$\theta_N$, i.e., $F(\theta_2, \ldots, \theta_N)=(au(t))^2$, and the function $F(\theta_2, \ldots, \theta_N)=(au(t))^2$ is regarded as the cost function in Gradient Descent; the error minimizer 262 uses Gradient Descent to simultaneously adjust the phase set $\theta_2$~$\theta_N$ and calculate the corresponding total fan acoustic noise power so as to find an optimum phase set $\theta_2$~$\theta_N$ for a minimum of the total fan acoustic noise power $(au(t))^2$ at runtime. In this manner, the error minimizer 262 performs phase tracking over the phase set $\theta_2$~$\theta_N$ to continually update the optimum phase set $\theta_2$~$\theta_N$ for a minimum of the total fan acoustic noise power in real time.

In the embodiment of FIGS. 2A-2C, since the PWM signals $P_1$~$P_N$ synchronize the fans 131~13N, the noises from the fans 131~13N are correlated due to their same rotational speeds. However, their noise waveforms are not necessarily the same because the fans 131~13N are normally disposed at different locations. By continually adjusting the phase set $\theta_2$~$\theta_N$ for the fans 131~13N, the total fan acoustic noise power would be reduced significantly. Although the "synchronous" fans 131~13N may produce a narrowband noise, adding one of the noise cancellation modules 15A~15D is capable of reducing the narrowband noise.

Figure 3A:
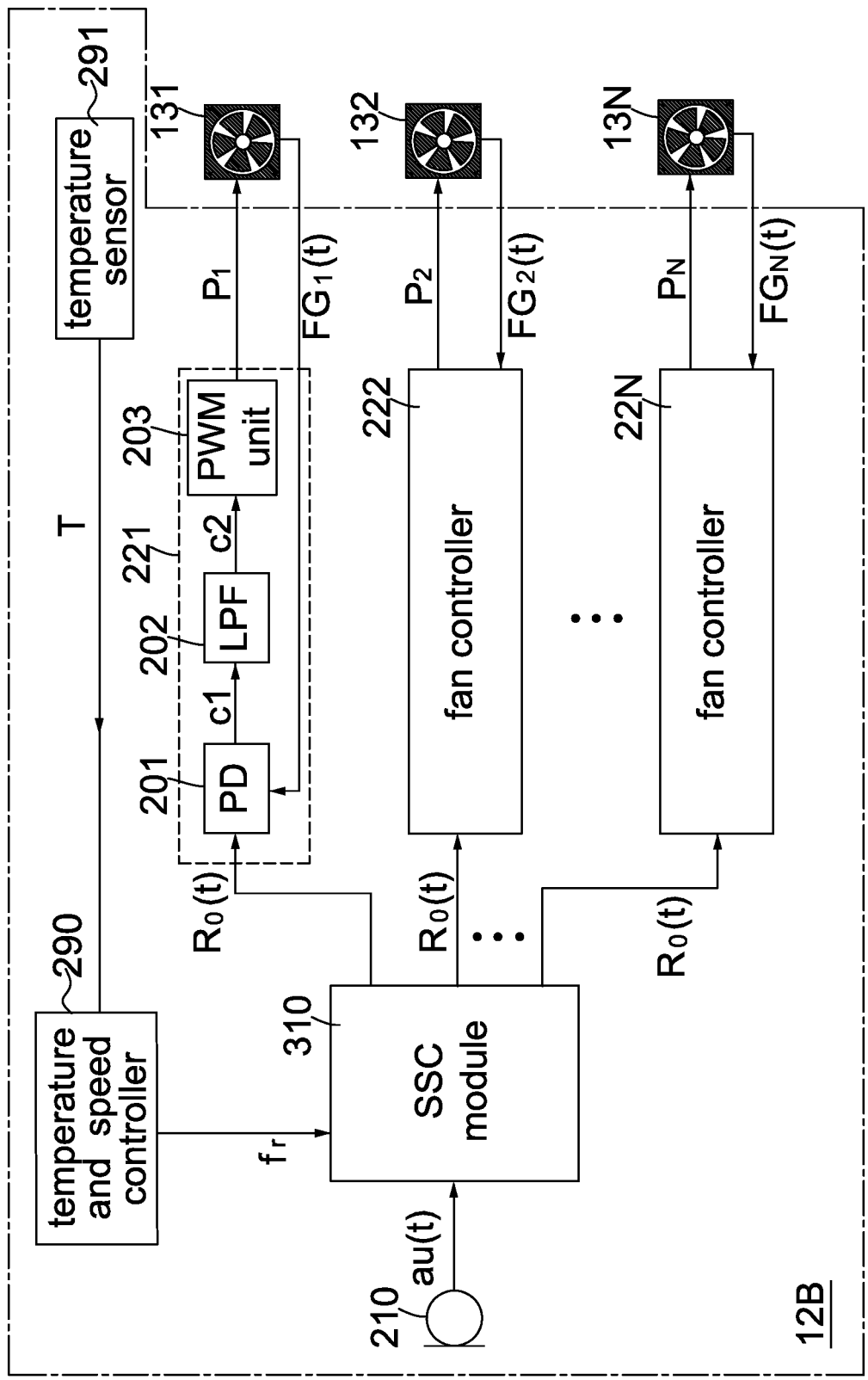
FIG. 3A is a block diagram of a main control circuit according to another embodiment of the invention.
Figure 3B:
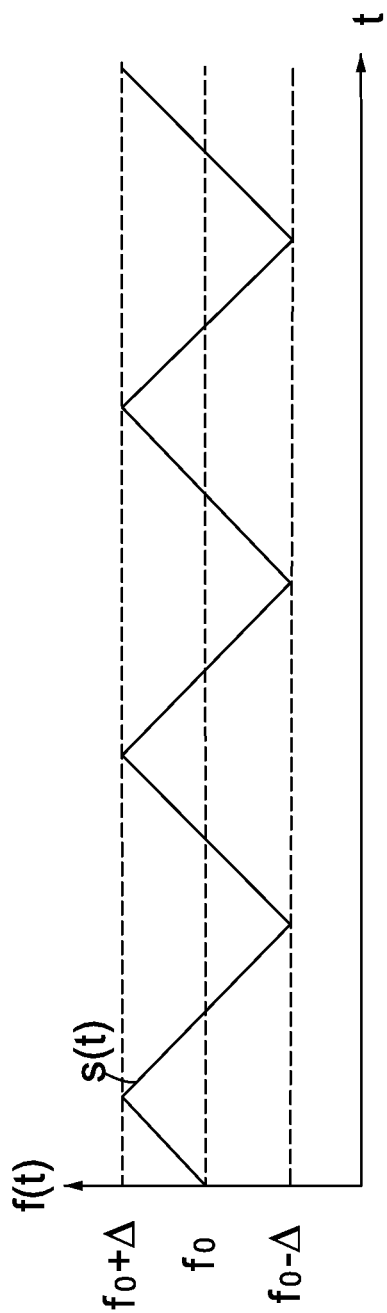
FIG. 3B is a diagram showing the frequency f(t) of the speed signal $R_0(t)$ ranges from $(f_0-\Delta)$ to $(f_0+\Delta)$, with an average value of $f_0$.

FIG. 3A is a block diagram of a main control circuit according to another embodiment of the invention. In comparison with FIG. 2A, the main control circuits 12A and 12B include similar components and the differences are that (1) the main control circuit 12B includes a spread-spectrum control (SSC) module 310, but excludes the MFMC module 250; and (2) the main control circuit 12A needs to operate together with multiple fans (i.e., N>=2) while the main control circuit 12B may operate together with one or more fans (i.e., N>=1). In the embodiment of FIG. 3A, a speed signal $R_0(t)$ with a signal frequency f(t) is applied to all the fan controllers 221~22N (each having a four-pole motor) in order to spread the fan noise power spectrum, where the frequency f(t) is time-varying and defined as $f(t)=f_0+s(t)$ and $f_0$ is equal to 2×fr. For example, if s(t) is a triangular wave, the frequency f(t) would range from $(f_0-\Delta)$ to $(f_0+\Delta)$, with an average value of $f_0$ and an amplitude of $\Delta$, as shown in FIG. 3B; the square wave generator 263 generates the speed signal $R_0(t)$ with the signal frequency f(t) according to the triangular waveform in FIG. 3B. As another example, a speed signal $R_0(t)$ with a signal frequency f(t) is applied to all the N fan controllers 221~22N (each having an eight-pole motor), where the frequency f(t) is time-varying and defined as $f(t)=f_0+s(t)$ and $f_0$ is equal to 4×fr.

Figure 3C:
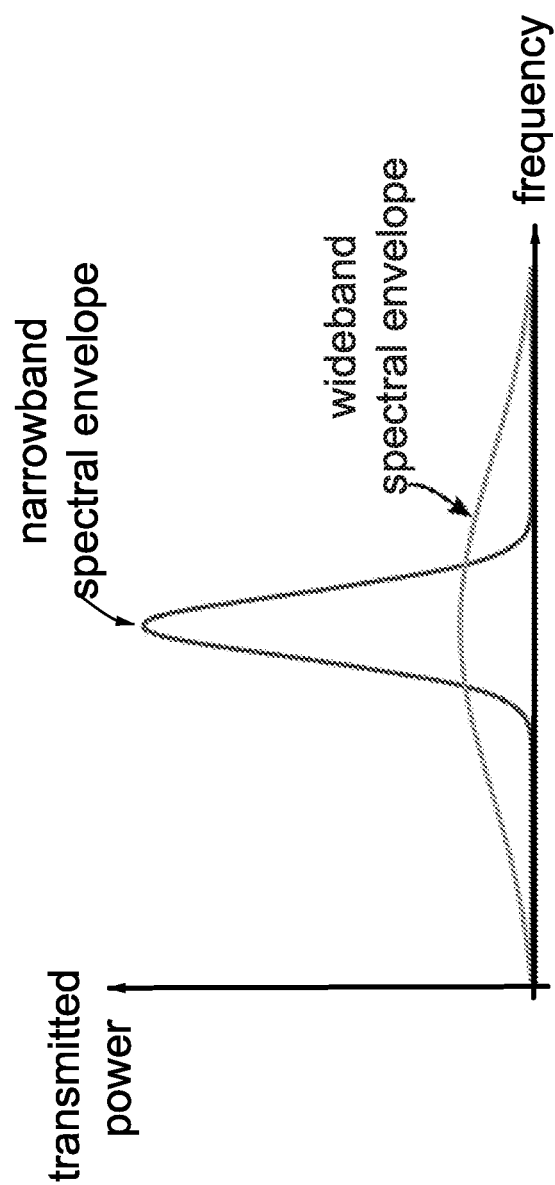
FIG. 3C is an example showing a narrowband spectral envelope associated with conventional fan control systems and a wideband spectral envelope associated with the main control circuit 12B of the invention.

FIG. 3D is a block diagram of SSC module 330 according to an embodiment of the invention. Referring to FIG. 3D, the SSC module 310 includes a spread-spectrum error minimizer 311, a triangular wave generator 312 and a square wave generator 263. After receiving the reference rotational speed value fr and the audio signal au(t), the spread-spectrum error minimizer 311 transmits a signal frequency $f_0$(=2×fr) to the triangular wave generator 312 and then uses any known optimization algorithm (such as Gradient Descent) to find an optimal value for a frequency variation $\Delta$ to minimize the total fan acoustic noise power picked up by the main microphone 210. The triangular wave generator 312 receives the signal frequency $f_0$ and the frequency variation $\Delta$ to generate a triangular wave f(t) ranging from $(f_0-\Delta)$ to $(f_0+\Delta)$, with an average of $f_0$ and an amplitude of $\Delta$, as shown in FIG. 3B. The square wave generator 263 receives the signal frequency f(t) to generate a speed signal $R_0(t)$ with frequency f(t). In one embodiment, the total fan acoustic noise power is a function of a frequency variation $\Delta$, i.e., $F(\Delta)=(au(t))^2$, and the function $F(\Delta)=(au(t))^2$ is regarded as the cost function in Gradient Descent; the spread-spectrum error minimizer 311 uses Gradient Descent to simultaneously adjust the frequency variation $\Delta$ and calculate the corresponding total fan acoustic noise power so as to find an optimum frequency variation $\Delta$ for a minimum of the total fan acoustic noise power $(au(t))^2$ at runtime. In this manner, the spread-spectrum error minimizer 311 performs variation tracking over the frequency variation $\Delta$ to continually update the optimum frequency variation $\Delta$ for a minimum of the total fan acoustic noise power in real time. In comparison with conventional fan control systems normally generating fan noise power spectrums with a narrowband spectral envelope, the fan noise power spectrum related to the main control circuit 12B is transformed into a wideband spectral envelope, and, especially, the envelope peak of the wideband spectral envelope is significantly reduced as shown in FIG. 3C. In this manner, by spreading the signal frequency f(t), applying the speed signal $R_0(t)$ to all the fans 131~13N and continually adjusting the optimum frequency variation $\Delta$ for the signal frequency f(t), the total noise power derived from the fans 131~13N would be reduced significantly.

Figure 4:
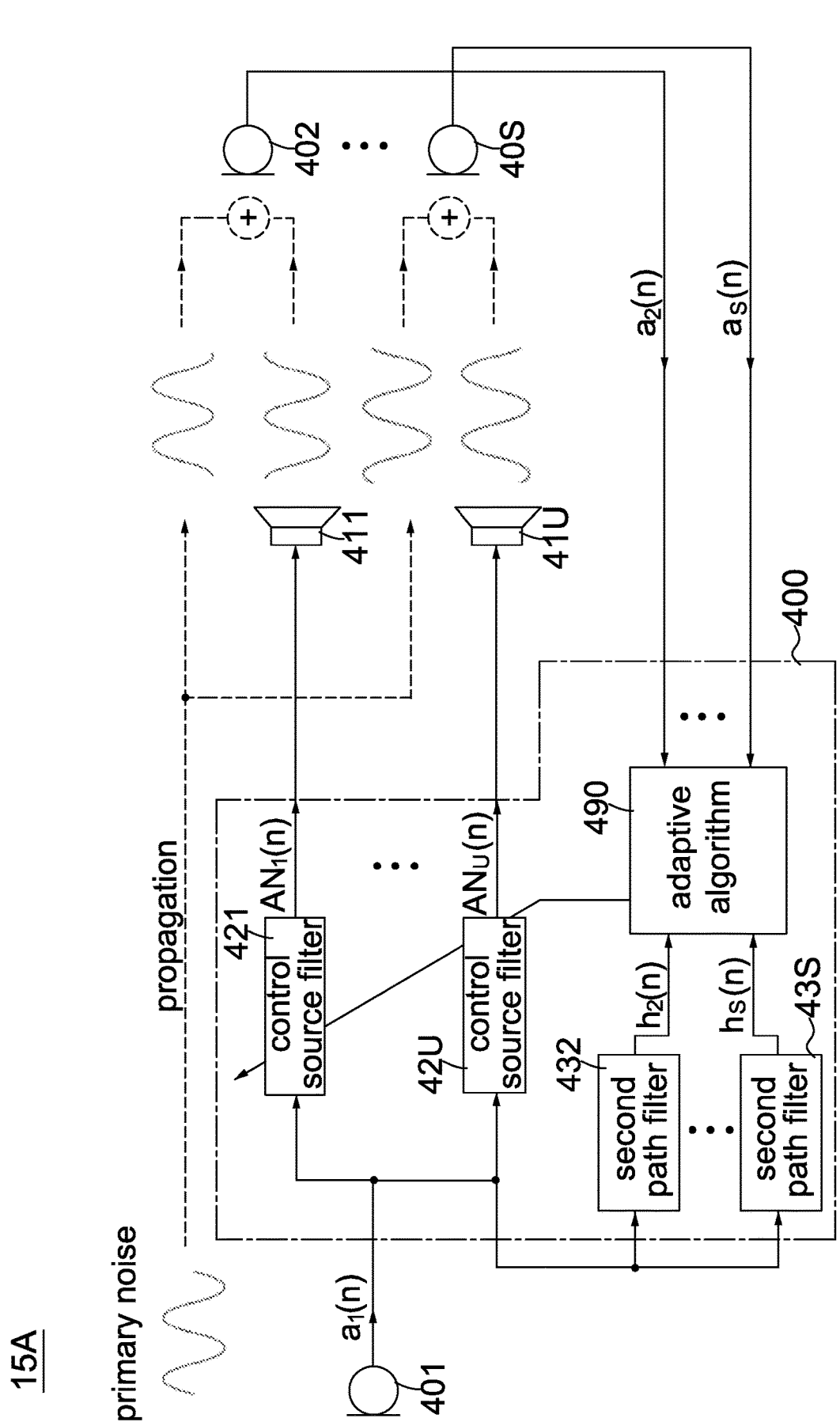
FIG. 4 is a schematic diagram of a convention ANC system.

FIG. 4 is a schematic diagram of a convention ANC system with s1=1. In an embodiment, a noise cancellation module 15A is implemented with the conventional ANC system in FIG. 4 that includes an ANC circuitry 400, a number S of microphones 401~40S (including a number s1 of reference microphones and a number s2 of error microphones) and a number U of speakers 411~41U, where each of parameters s1, s2 and U is greater than or equal to 1 and s1+s2=S. The audio signals $a_1(n)$~$a_S(n)$ from the microphones 401~40S may be analog or digital. If the audio signals from the microphones 401~40S are analog, they may be digitized using techniques well known in the art before fed into the ANC circuitry 400. The ANC circuitry 400 includes a number (S−1) of second path filters 432~43S, an adaptive algorithm block 490 and a number U of control source filters 421~42U. Each of second path filters 432~43S generates a corresponding prefiltered reference signal hi(n) in response to the audio signals $a_1(n)$ and consists of a model of the secondary path that is the frequency response function from a corresponding secondary source (i.e., one of the speakers 411~41U) to the position of one of the error microphones 402~40S, where 2<=i<=S. The adaptive algorithm block 490 updates the coefficients of the control source filters 421~42U according to prefiltered reference signals $h_2(n)$~$h_S(n)$ and the residual signals $a_2(n)$~$a_S(n)$ to adjust frequency responses of the control source filters 421~42U. In one embodiment, the adaptive algorithm block 490 is implemented by a least mean square (LMS) algorithm to control the coefficients of the control source filters 421-42U; thus, the ANC circuitry 400, including the control source filters 421~42U, the second path filters 432~43S, and the LMS algorithm 490, constructs a filtered-x Least mean square (FxLMS) filter, which is an adaptive filter. The error microphone 402~40S are placed in the sound field while the reference microphone 401 is placed in proximity to the noise source (i.e., the fans 131~13N). The speakers 411~41U are placed in proximity to the error microphones 402~40S and used to play the anti-noise signals $AN_1(n)$~$AN_U(n)$ from the ANC circuitry 400. Each of the error microphones 402~40S receives a residual signal $a_i(n)$ that is the acoustic addition of the output signals of the speakers 411~41U and a corresponding primary signal from the noise source (i.e., the fans 131~13N), for 2<=i<=S. During the active noise cancellation process, the ANC circuitry 400 receives the reference signal $a_1(n)$ and the residual signals $a_2(n)$~$a_S(n)$, adjusts the coefficients of the control source filters 421~42U and transmits the anti-noise signals $AN_1(n)$~$AN_U(n)$ to the speakers 411~41U for cancellation of the fan noise. Since the operations and structures of the ANC circuitry 400 are well known in the art, their detailed descriptions are omitted herein.

Figure 5A:
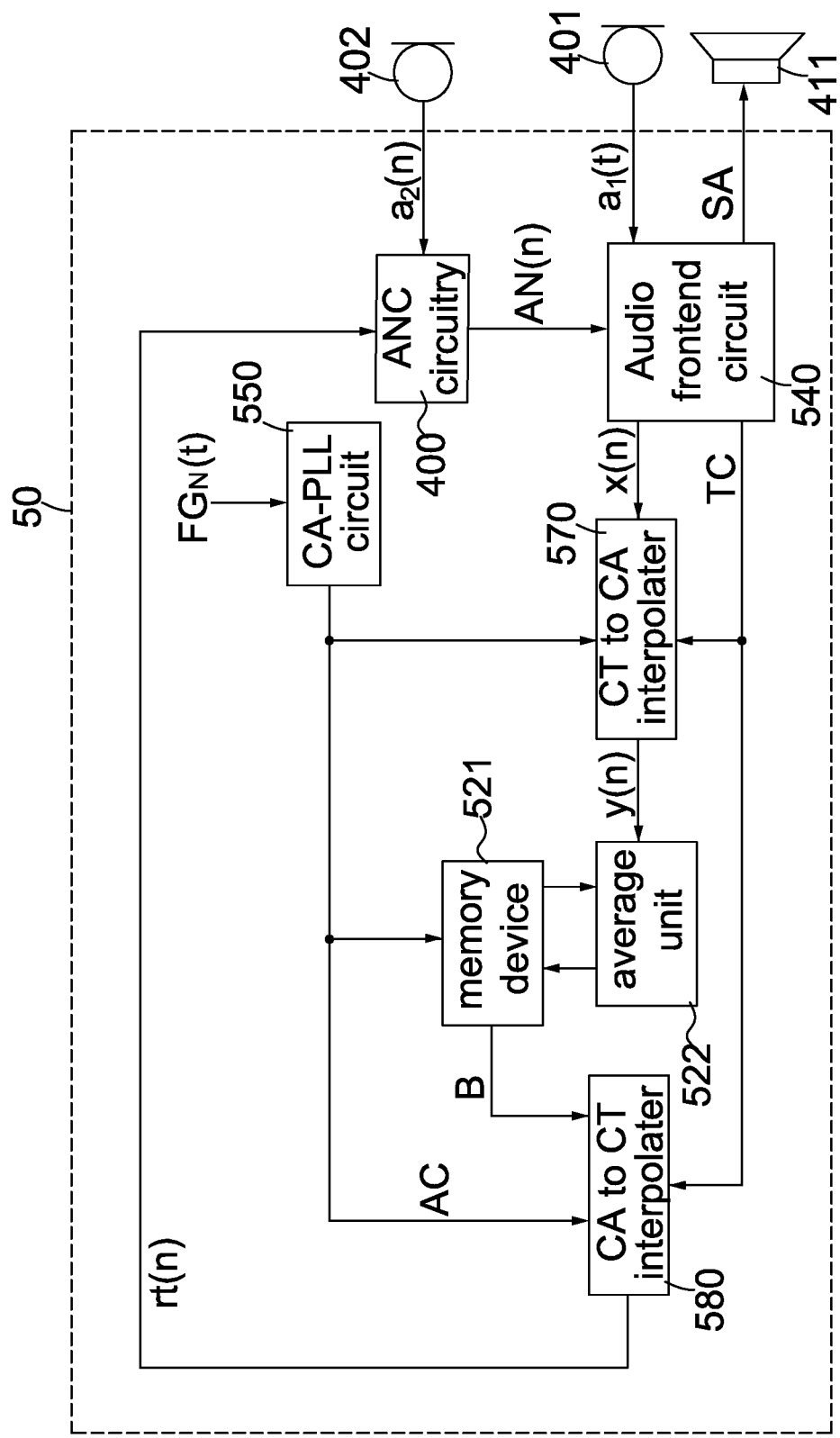
FIG. 5A is a block diagram of a noise cancellation module according to an embodiment of the invention.
Figure 5B:
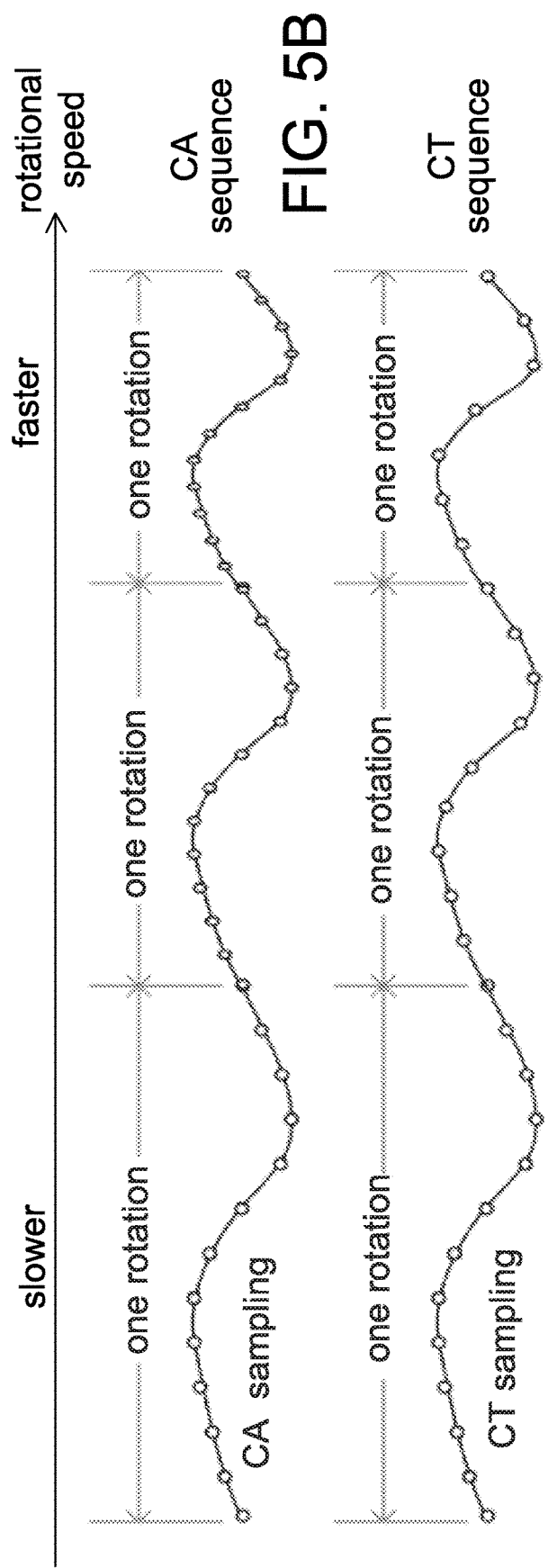
FIG. 5B is an exemplary diagram showing an audio signal is sampled at a fixed time interval to obtain a CT digital sequence and sampled at every predefined-degree rotation of the fans in one direction to obtain a CA digital sequence.
Figure 5C:
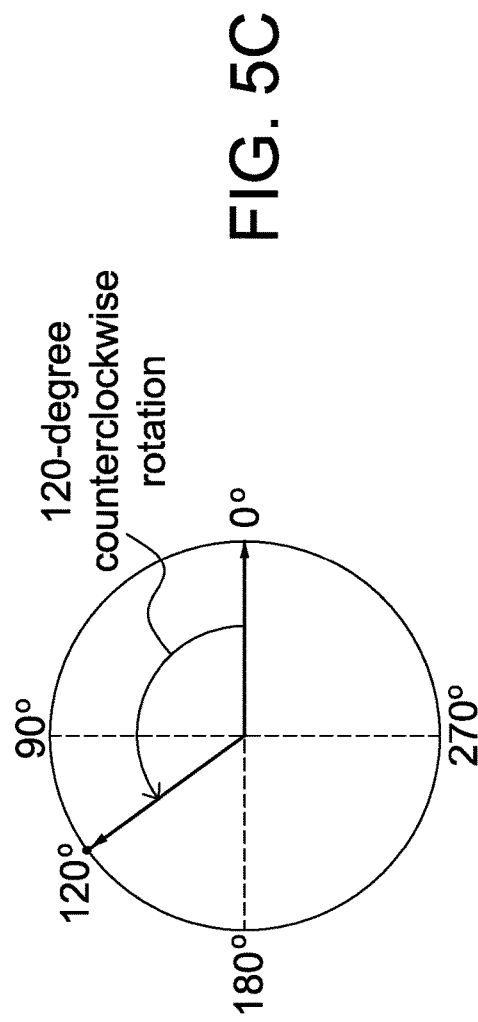
FIG. 5C is an example showing a fan shaft makes a 120-degree counterclockwise rotation relative to a reference degree of 0°.

FIG. 5A is a block diagram of a noise cancellation module 15B according to an embodiment of the invention. Referring to FIG. 5A, the noise cancellation module 15B includes a noise cancellation engine 50, a reference microphone 401, an error microphone 402 and one speaker 411. The noise cancellation engine 50 includes a constant-angle phase-locked loop (CA-PLL) circuit 550, an ANC circuitry 400, a memory device 521, an average unit 522, a CA-to-CT interpolator 580, a CT-to-CA interpolator 570, and an audio frontend (AFE) circuit 540. FIG. 5B is an exemplary diagram showing an audio signal is sampled at a fixed time interval to obtain a CT digital sequence and sampled at a fixed-degree rotation of the fans in one direction to obtain a CA digital sequence. Throughout the specification and claims, the following terms take the meanings explicitly associated herein, unless the context clearly dictates otherwise. The term "constant-time sampling (CT sampling/CT mode)" refers to an audio signal is sampled at a fixed sampling rate fs (or a fixed time interval 1/fs) to obtain a CT digital sequence as shown in bottom graph of FIG. 5B. The term "constant-angle (CA sampling/CA mode)" refers to an audio signal is sampled for every fixed-degree rotation of the fans in one direction (clockwise or counterclockwise), e.g., every 2-degree counterclockwise rotation, to obtain a CA digital sequence as shown in top graph of FIG. 5B. According to the invention, if an audio signal is sampled q (=1024) times in one rotation of the fan, it indicates the audio signal is sampled either for every 360/q(=360/1024)-degree rotation or at a fixed 360/q(=360/1024)-degree rotation. FIG. 5C is an example showing a fan shaft makes a 120-degree counterclockwise rotation relative to a reference degree of 0°.

Figure 6:
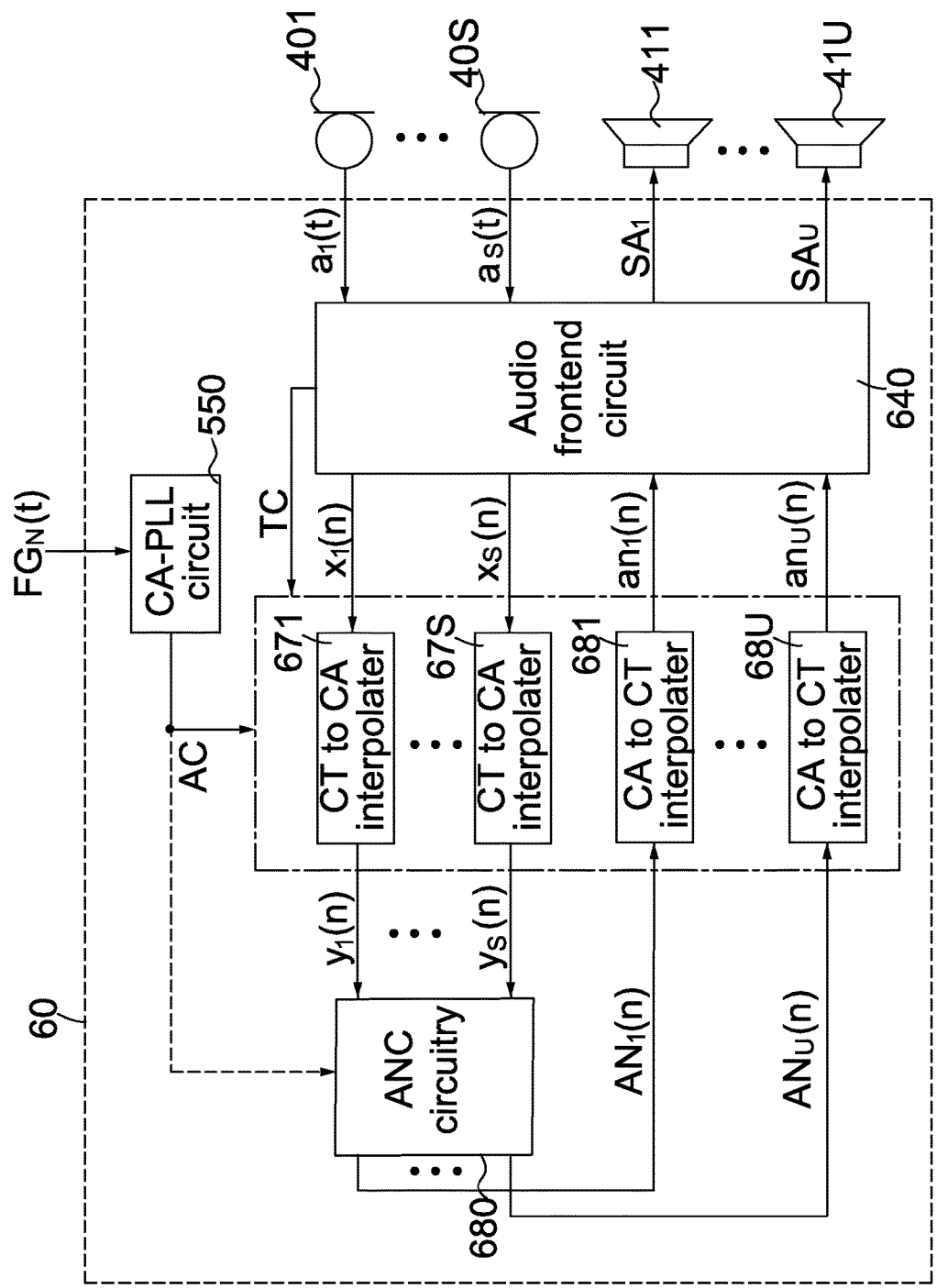
FIG. 6 is a block diagram of a noise cancellation module according to another embodiment of the invention.

In the embodiment of FIGS. 5A and 6, it is assumed that the fan noise is caused by the friction between the fan blades and the air, the instantaneous rotational positions/angles (IRP) of the fan blades are strongly correlated to the noise waveforms (called "correlation to IRP"), and the shapes of the noise waveforms for all rotations of the fans are periodic (called "noise periodicity"). Thus, due to the features of "correlation to IRP and "noise periodicity", although the noise waveforms in top graph of FIG. 5B may extend or compress according to the rotational speeds of the fans, the noise magnitudes at the predefined degrees of rotation for all periods are substantially the same in the CA sequence derived from the audio signal $a_1(t)$ in FIG. 5A. For example, for all periods in the CA sequence, the noise magnitudes at a five-degree counterclockwise rotation are substantially equal to A, the noise magnitudes at a ten-degree counterclockwise rotation are substantially equal to B, and the like. Thus, the CA sequence in FIG. 5B is periodic with period Ns, where Ns denotes the number of samples in one rotation/period.

Figure 5D:
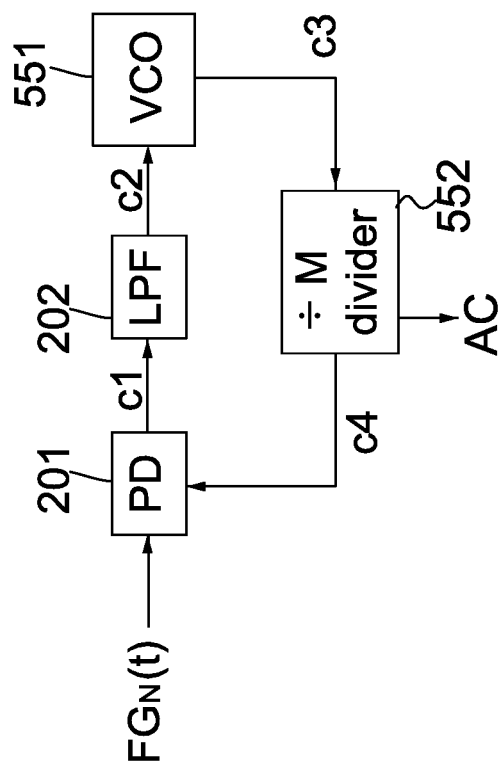
FIG. 5D is a schematic diagram of constant-angle phase-locked loop (CA-PLL) circuit 550 according to an embodiment of the invention.

FIG. 5D is a schematic diagram of constant-angle phase-locked loop (CA-PLL) circuit 550 according to an embodiment of the invention. Referring to FIG. 5D, the CA-PLL circuit 550 includes a phase detector 201, a LPF 202, a voltage-controlled oscillator (VCO) 551 and a frequency divider 552. As well known in the art, the CA-PLL circuit 550 is called "integer-M PLL". The phase detector 201 measures the phase difference between the tach signal $FG_N(t)$ and an oscillation signal c4 to generate a phase difference signal c1. The LPF 202 eliminates the high-frequency components in the phase difference signal c1 to obtain a voltage control voltage c2. The VCO 551 generates an oscillation signal c3 with a frequency $f_{VCO}$ according to the voltage control voltage c2. The frequency divider 552 divides the frequency $f_{VCO}$ of the oscillation signal c3 by M to obtain an oscillation signal c4 with a frequency $f_{C4}$ (=$f_{VCO}$/M). As well known in the art, each tach signal $FG_i(t)$ produces two cycles of rectangular waveform as the fan with a four-pole motor makes one rotation, where 1<=i<=N; if a total of 1024 samples in one rotation is desired, then M is set to 512 for the frequency divider 552 and a counter (not shown) embedded in the frequency divider 552 sequentially generates count values AC ranging from 0~1023 for each rotation. As another example, if each tach signal $FG_i(t)$ produces four cycles of rectangular waveform as the fan with an eight-pole motor makes one rotation, where 1<=i<=N; if a total of 1024 samples in one rotation is desired, then M is set to 256 for the frequency divider 552 and the counter (not shown) embedded in the frequency divider 552 sequentially generates count values AC ranging from 0~1023 for each rotation. The count value AC is provided as a sampling clock for the CA mode. The sampling points in CA mode are present whenever the count value AC changes (proportional to the rotational speed of the fan). Accordingly, the count value AC is hereinafter called "sampling clock AC".

Figure 5E:
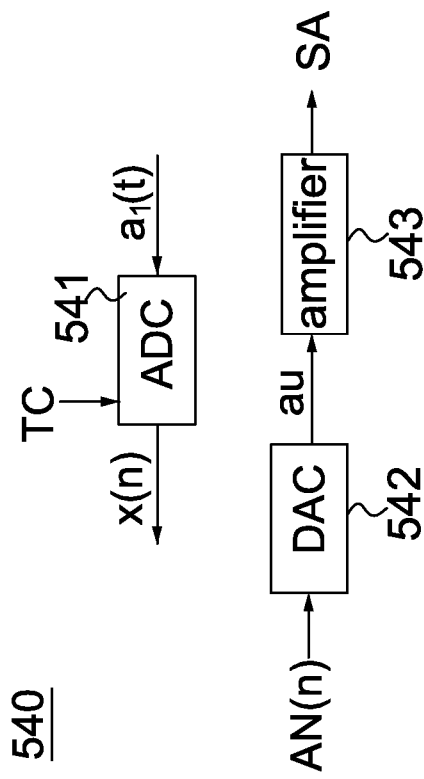
FIG. 5E is a schematic diagram of audio frontend (AFE) circuit 540 according to an embodiment of the invention.

FIG. 5E is a schematic diagram of audio frontend (AFE) circuit 540 according to an embodiment of the invention. Referring to FIG. 5E, the AFE circuit 540 includes an analog-to-digital converter (ADC) 541, a digital-to-analog converter (DAC) 542 and an amplifier 543. In CT mode, the ADC 541 converts the analog audio signal $a_1(t)$ from the reference microphone 401 into a CT sequence x(n) based on a sampling clock TC with a sampling rate fs, where n denotes the discrete time index. On the other hand, the DAC 542 converts the digital anti-noise sequence AN(n) into an analog signal au and then the amplifier 543 amplifies the analog audio signal au to produce an amplified signal SA. Finally, the speaker 411 converts the amplified signal SA into a sound pressure signal.

Figure 5F:
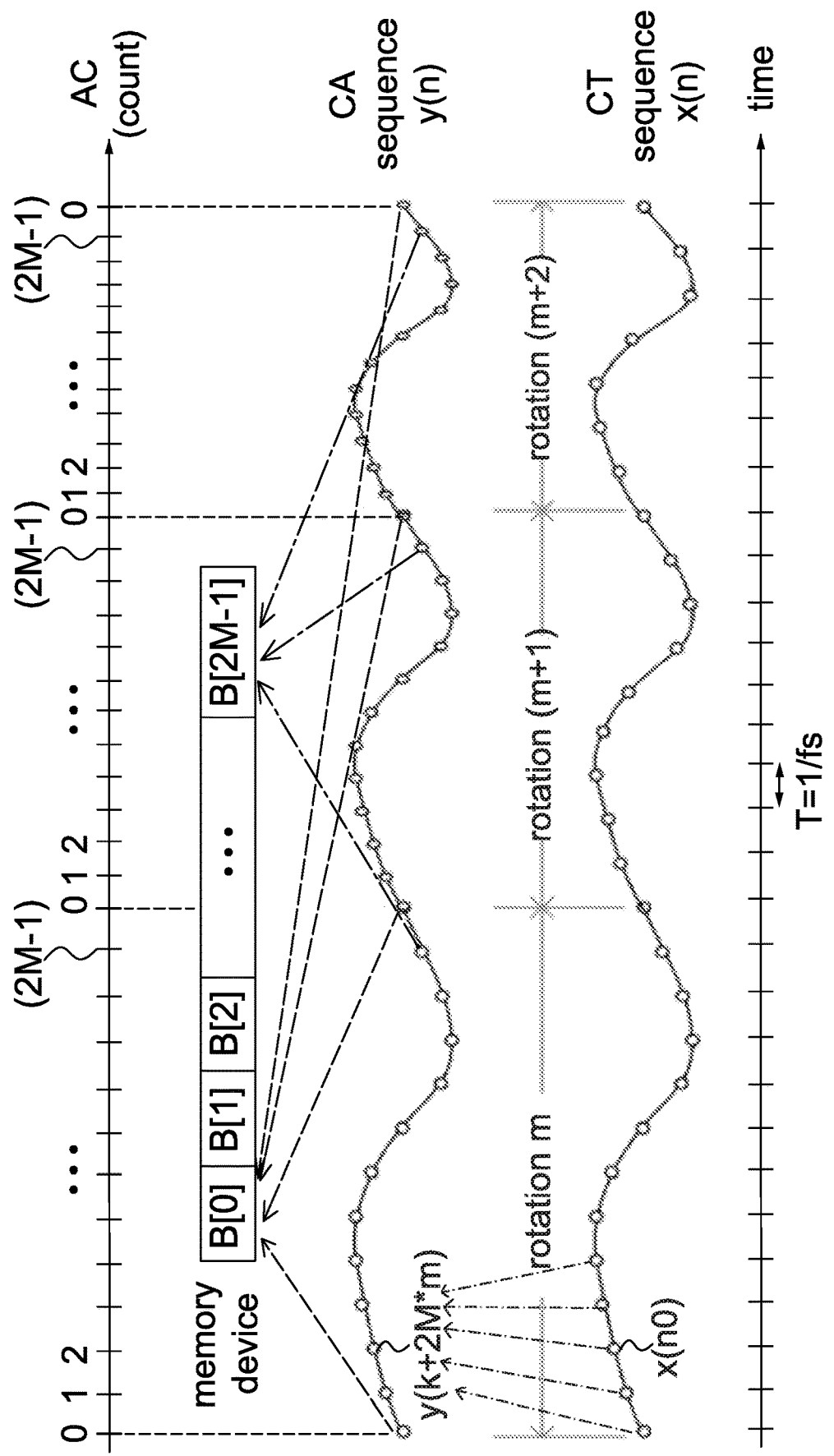
FIG. 5F is an exemplary diagram showing an analog audio signal au(t) from the microphone 401 in FIG. 5A is sampled based on the sampling clock TC to obtain a CT sequence x(n) and a CA sequence y(n) is obtained by performing CT-to-CA interpolation over multiple sample values of the AC sequence x(n) based on the sampling clock AC.

FIG. 5F is an exemplary diagram showing an analog audio signal $a_1(t)$ from the reference microphone 401 is sampled based on the sampling clock TC to obtain a CT sequence x(n) and then a CA sequence y(n) is obtained by performing interpolation over the CT sequence x(n) based on the sampling clock AC. As stated in the description associated with FIG. 5B, the CA sequence is periodic. Thus, the CA sequence y(n)=y(k+2M×m)=y(k), where m denotes the period/rotation index, 2M denotes the number of samples in one period and k denotes the sample index in each period/rotation and ranges from 0 to (2M−1). The CT-to-CA interpolator 570 is configured to perform CT-to-CA interpolation operation over values of multiple sample points around a first sample point x(n0) (i.e., at n=n0) in the CT sequence x(n) based on the sampling clock TC to obtain the value of a second sample point y(k) (i.e., at n=k) in the CA sequence y(n) based on the sampling clock AC, where the first sample point x(n0) in the CT sequence x(n) is the closet sample to the second sample point y(k) in time axis as shown in FIG. 5F. As an example, according to a predefined sample distance d1 relative to the first sample point x(n0) in the CT sequence x(n), there are a total of (2×d1+1) sample values in the CT sequence x(n) for the CT-to-CA interpolation operation as follows: x(n0−d1), x(n0−d1+1), . . . , x(n0), x(n0+1), . . . , and x(n0+d1). In this scenario, y(k+2M×m)=y(k)=INTP1(x(n0−d1), x(n0−d1+1), . . . , x(n0), x(n0+1), . . . , x(n0+d1)), where INTP1(·) denotes the CT-to-CA interpolation function/operation performed by the CT-to-CA interpolator 570.

As set forth above, it is assumed that the shapes of the noise waveforms for all rotations of the fans are periodic. Moreover, in the embodiment of FIG. 5A, it is assumed that the noise magnitudes at all predefined degrees of rotation for all periods of the noise waveforms are the same in the CA sequence y(n). Accordingly, the average unit 522 is configured to average all the sample values at the same degree of rotation (e.g., a dr-degree of rotation) to obtain an averaged sample value for the dr degree of rotation in one period and the memory device 521 is configured to store all the averaged sample values for all predefined degrees of rotation in one period. In the example of FIG. 5F, the memory device 521 includes a one-dimensional data array B storing a total of 2M averaged sample values in one rotation/period, and each element of the 1D data array B is accessible by an index k, for k=0~(2M−1). For each pulse of the sampling clock AC, the average unit 522 receives a current sample value y(k+2M×m)=y(k) of the current rotation m from the CT-to-CA interpolator 570, retrieves an averaged sample value B[k] of a previous period/rotation (m−1) from the data array B by an index k, performs moving average operation over y(k) and B[k] to obtain an averaged sample value B[k] of the current period/rotation m and finally stores the current averaged sample value B[k] of the current rotation m back to the data array B according to its index k, where B[k]=α×B[k]+(1−α)×y(k+2M×(m−1)), for m>0, and all the elements in data array B are reset to zero upon initialization. Here, the coefficient α represents the degree of weighting decrease, i.e., a constant smoothing factor between 0 and 1. A higher α discounts older observations slower. In fact, the 2M averaged sample values B[0]~B[2M−1] for one single rotation/period stored in the 1D data array B are regarded as "noise prototype".

Figure 5G:
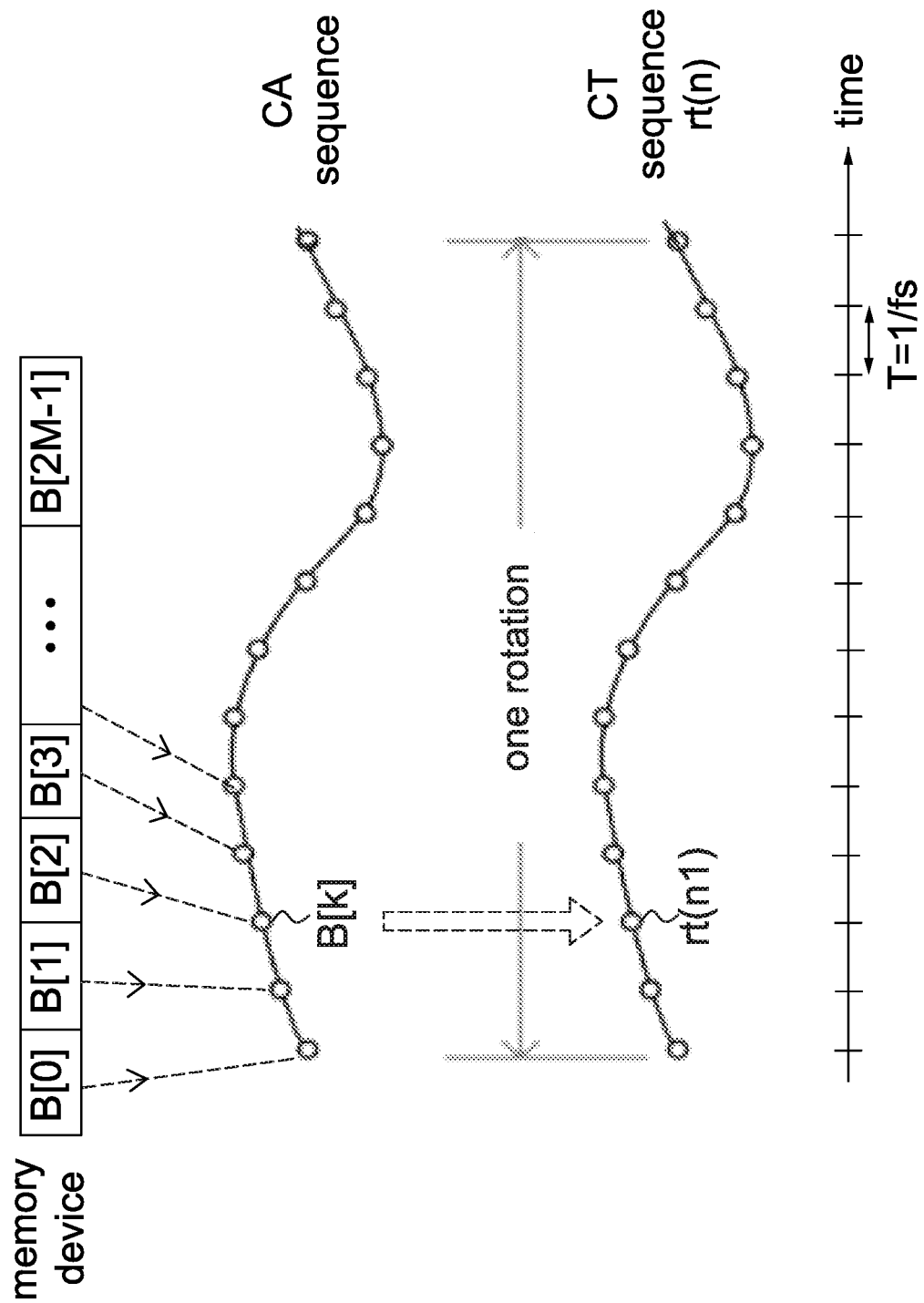
FIG. 5G is an exemplary diagram showing the CA-to-CT interpolation operation with d2=2.

The CA-to-CT interpolator 580 is configured to perform CA-to-CT interpolation operation over multiple averaged sample values around a third sample point B[k] in data array B based on the sampling clock AC to obtain the value of a fourth sample point rt(n1) (i.e., at n=n1) in a reference signal rt(n) (i.e., a CT sequence) based on the sampling clock TC, where the third sample point B[k] in the CA sequence is the closet sample to the fourth sample point rt(n1) in time axis, as shown in FIG. 5G. Here, k=(n % 2M) and k ranges from 0 to (2M−1). As an example, according to a predefined sample distance d2 relative to the third sample point B[k], there are a total of (2×d2+1) averaged sample values in the data array B for the CA-to-CT interpolation operation as follows: B[k−d2], B[k−(d2−1)], . . . , B[k], B[k+1], . . . , and B[k+d2]. In this scenario, rt(n1)=INTP2(B[k−d2], B[k−(d2−1)], . . . , B[k], B[k+1], . . . , B[k+d2]), where INTP2(·) denotes the interpolation function/operation performed by the CA-to-CT interpolator 580. FIG. 5G is an exemplary diagram showing the CA-to-CT interpolation operation with d2=2. Finally, the ANC circuitry 400 (with s1=s2=U=1) in FIG. 5A receives the reference signal rt(n) and the residual signal $a_2(n)$ to generate an anti-noise signal AN(n) for cancellation of the fan noise. In a preferred embodiment, the interpolation operations performed by the interpolators 570 and 580 are implemented by Lagrange interpolation. In an alternative embodiment, the interpolation operations performed by the interpolators 570 and 580 are implemented by one of linear interpolation, polynomial interpolation and spline interpolation. In the embodiment of FIG. 5A, "averaging" the noise magnitudes for all predefined degrees of rotation in all periods of CA sequence by the average unit 522 constitutes a solid base for the ANC operation of the ANC circuitry 400. Thus, the ANC performance of the ANC circuitry 400 is greatly improved.

As set forth above, in the embodiments of FIGS. 5A and 6, it is assumed that there are two features: "correlation to IRP" and "noise periodicity" for noise waveforms (that are CA sequences). FIG. 6 is a block diagram of a noise cancellation module according to another embodiment of the invention. Referring to FIG. 6, the noise cancellation module 15C includes a noise cancellation engine 60, a number S of microphones 401~40S (including a number s1 of reference microphones and a number s2 of error microphones) and a number U of speakers 411~41U, where each parameter s1, s2 and U is greater than or equal to 1 and s1+s2=S. The noise cancellation engine 60 includes a CA-PLL circuit 550, an ANC circuitry 680, a number U of CA-to-CT interpolators 681~68U, a number S of CT-to-CA interpolators 671~67S, and an AFE circuit 640. The AFE circuit 640 includes a number S of ADCs 541 and a number U of DACs 542 and amplifiers 543 in FIG. 5E. The operations of the CA-to-CT interpolators 681~68U are the same as those of the CA-to-CT interpolator 580, and the operations of the CT-to-CA interpolators 671~67S are the same as those of the CT-to-CA interpolator 570. Thus, the detailed descriptions of interpolators 671~67S and 681~68U are omitted herein.

Due to the fact that the ANC circuitry 680 directly receives a number S of CA sequences $y_1(n){\sim}y_S(n)$ and directly generates a number U of CA sequences $AN_1(n){\sim}AN_U(n)$, it is obvious that the ANC circuitry 680 operates in CA mode. The ANC circuitry 680 utilizes the periodicity of the CA sequences $y_1(n){\sim}y_S(n)$ and operates in synchronization with the sampling clock AC (proportional to the rotational speed of the fans), thus achieving better noise attenuation. The ANC circuitry 680 may be implemented by one of the ANC circuitry 400 in FIG. 4 (without the sampling clock AC) and the ANC circuitry 680A (with the sampling clock AC) in FIG. 7A.

Figure 7A:
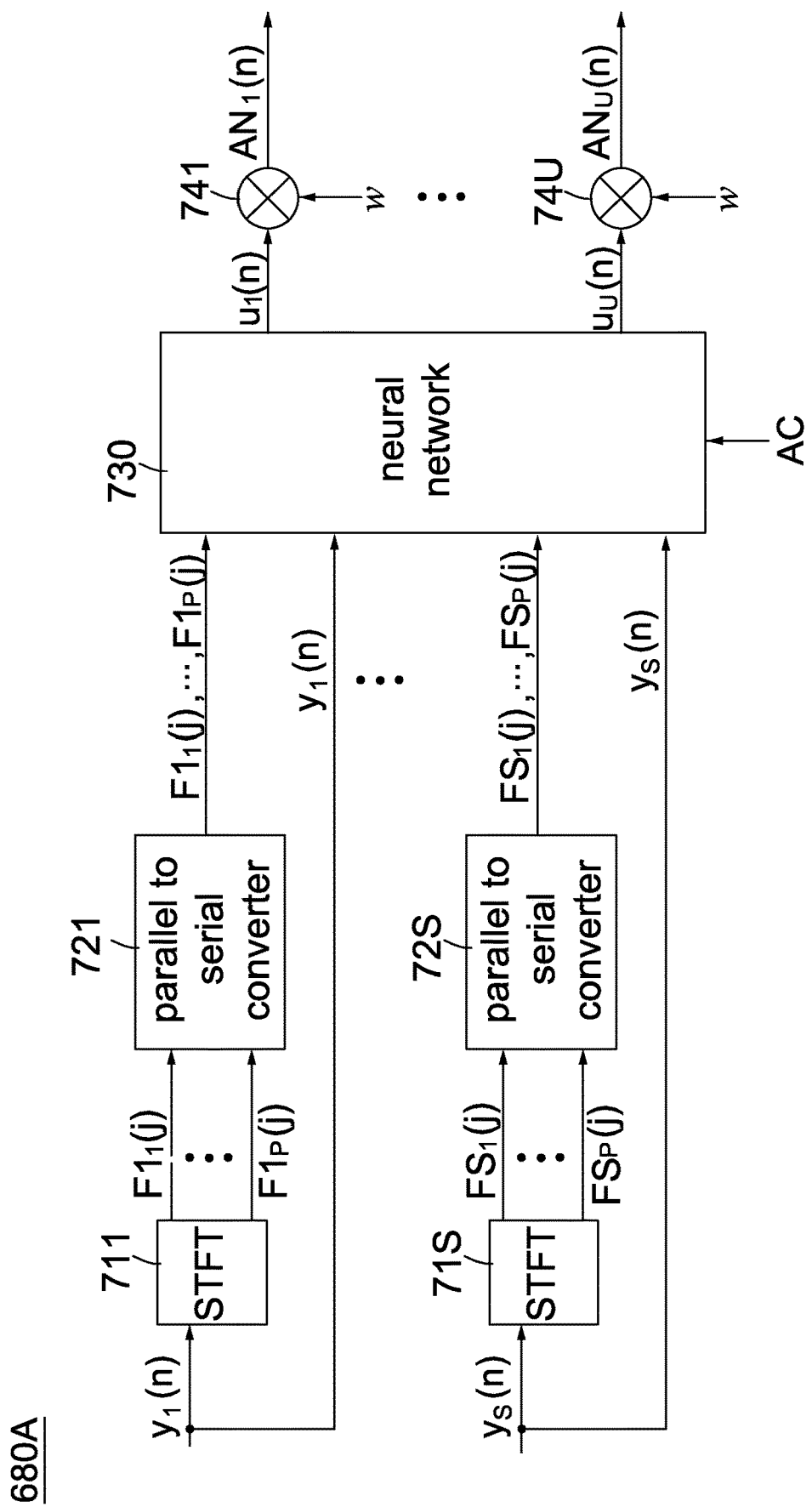
FIG. 7A is a block diagram of ANC circuitry 680A according to an embodiment of the invention.

FIG. 7A is a block diagram of ANC circuitry 680A according to an embodiment of the invention. The ANC circuitry 680A includes a number S of short-time Fourier transform(STFT) blocks 711~71S, a number S of parallel-to-serial converters (PSC) 721~72S, a neural network 730 and a number U of multipliers 741~74U. Please note that among the number S of CA sequences $y_1(n){\sim}y_S(n)$, there are a number s1 of CA sequences derived from the s1 reference microphones and a number s2 of CA sequences derived from s2 error microphones, where s1+s2=S and s1, s2>=1. Please also note that the number U of multipliers 741~74U are optional.

In each of STFT blocks 711~71S, the CA sequence $y_g(n)$ is firstly broken up into frames using a sliding window along the time axis so that the frames overlap each other to reduce artifacts at the boundary, and then, the audio data in each frame in time domain are transformed by Fast Fourier transform (FFT) into complex-valued data in frequency domain, for 1=<g<=S. Assuming a number of sampling points in each frame (or the FFT size) is P, the time duration for each frame is Td and the frames overlap each other by Td/2, the STFT block 71g divides the CA sequence $y_g(n)$ into a plurality of frames and computes the FFT of audio data in the current frame j of the CA sequence $y_g(n)$ to generate a current spectral representation Fg(j) having P complex-valued samples $(Fg_1(j){\sim}Fg_P(j))$. Here, each frame corresponds to a different time interval of the CA sequence $y_g(n)$. In a preferred embodiment, the time duration Td of each frame is about 32 milliseconds (ms). However, the above time duration Td is provided by way of example and not limitation of the invention. In actual implementations, other time duration Td may be used. Afterward, the PSC 72g converts the corresponding P parallel complex-valued samples $(Fg_1(j){\sim}Fg_P(j))$ into a serial sample stream, starting from $Fg_1(j)$ and ending with $Fg_P(j)$, for 1=<g<=S. The neural network 730 receives the sampling clock AC, a number S of the current spectral representations F1(j)~FS(j) and audio data for current frames j of the number S of time-domain signals $y_1(n){\sim}y_S(n)$, performs ANC operation to generate audio data of the current frames j of a number U of time-domain anti-noise digital data sequences $u_1(n){\sim}u_U(n)$. Each multiplier 74h sequentially multiplies each sample in the current frame j of a corresponding digital sequence $u_h(n)$ by w to obtain audio data in the current frame j of a modified CA sequence $AN_h(n)$, where w denotes a weight for adjusting the ANC level, 1=<h<=U.

The neural network 730 may be implemented by a deep neural network (DNN), a convolutional neural network (CNN), a recurrent neural network (RNN), a time delay neural network (TDNN) or any combination thereof. Various machine learning techniques associated with supervised learning may be used to train a model of the neural network 730 (hereinafter called "model 730" for short). Example supervised learning techniques to train the neural network 730 include, without limitation, stochastic gradient descent (SGD). In supervised learning, a function $f$ (i.e., the model 730) is created by using a set of labeled training examples (will be described below), each of which consists of an input feature vector and a labeled output. The neural network 730 is configured to use the set of labeled training examples to learn or estimate the function $f$ (i.e., the model 730), and then to update model weights using the backpropagation algorithm in combination with cost function. Backpropagation iteratively computes the gradient of cost function relative to each weight and bias, then updates the weights and biases in the opposite direction of the gradient, to find a local minimum. The goal of a learning in the neural network 730 is to minimize the cost function given the set of labeled training examples.

Figure 7B:
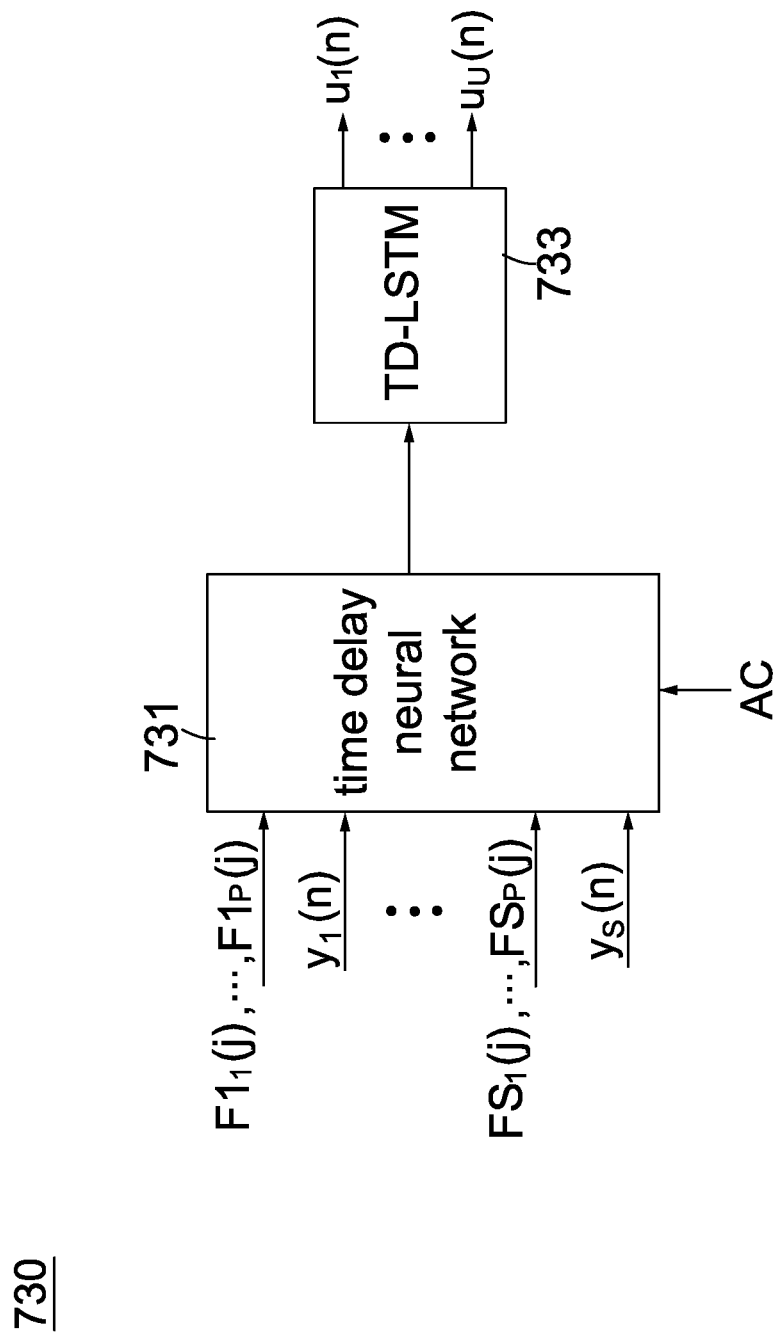
FIG. 7B is a schematic diagram of a neural network 730 according to an embodiment of the invention.

FIG. 7B is a schematic diagram of a neural network 730 according to an embodiment of the invention. In a preferred embodiment, referring to FIG. 7B, the neural network 730 includes a time delay neural network (TDNN) 731, and a time-domain long short-term memory (TD-LSTM) network 733. In this embodiment, the TDNN 731 with "shift-invariance" property is used to process time series audio data. The significance of shift invariance is that it avoids the difficulties of automatic segmentation of the audio signal to be recognized by the uses of layers of shifting time-windows. The TD-LSTM network 733 has feedback connections and thus is well-suited to classifying, processing and making predictions based on time series audio data, since there can be lags of unknown duration between important events in a time series. Besides, the TDNN 731 is capable of extracting short-term (e.g., less than 100 ms) audio features such as magnitudes, phases, pitches and non-stationary sounds, while the TD-LSTM network 733 is capable of extracting long-term (e.g., ranging from 100 ms to 3 seconds) audio features such as scenes, and sounds correlated with the scenes. Please be noted that the above embodiment (TDNN 731 with TD-LSTM network 733) is provided by way of example and not limitations of the invention. In actual implementations, any other type of neural networks can be used and this also falls in the scope of the invention.

To attenuate the fan noise picked up by the s2 error microphones, the input data for the set of labeled training examples are various fan noise data collected by operating the fans at different rotational speeds, and the ground truth for each example in the set of labeled training examples requires U×P sample values of the time-domain "anti-noise" audio streams $u_1(n){\sim}u_U(n)$. In a training phase, the TDNN 731 and the TD-LSTM network 733 are jointly trained with the set of labeled training examples, each labeled as U×P corresponding time-domain audio sample values; the loss function is the average power of the residual signals $e_1(n){\sim}e_{s2}(n)$ received by the s2 error microphones and defined as $$\text{Loss} = \sum\nolimits_{g=1}^{s2} \frac{e_g^2(n)}{s2}.$$

The loss function is used to objectively measure how much the network's current output is different than the expected output (the corresponding label). When trained, the TDNN 731 and the TD-LSTM network 733 can process new unlabeled audio data, for example audio feature vectors, to generate U×P corresponding sample values for the current frames j of the time-domain "anti-noise" audio sequences $u_1(n){\sim}u_U(n)$. In one embodiment, the neural network 730 is implemented by at least one processor and at least one storage media (not shown). The at least one storage media stores instructions/program codes operable to be executed by the at least one processor to cause the at least one processor to function as: the neural network 730.

FIG. 8A is a block diagram of a noise cancellation system according to an embodiment of the invention. In an embodiment, a noise cancellation module 15D, suitable for use in a notebook or a laptop computer, includes Q noise cancellation systems 81~8Q, where 1<=Q<=N. Referring to FIG. 8A, each noise cancellation system 8j includes a noise cancellation engine 810, an air duct 820, a number S of microphones 401~40S (including s1 reference microphones and s2 error microphones), and a number U of speakers 411~41U, where each parameter s1, s2, U>=1, s1+s2=S and 1<=j<=Q<=N. The air duct 820 is connected to at least one of the fans 131~13N. An air inlet 821 is formed on the air duct 820 and located at an end opposite to the fans 131~13N. An air flow may enter the air duct 820 from the air inlet 821, and then go out at the at least one of the fans 131~13N; contrarily, the air flow may enter the air duct 820 from the at least one of the fans 131~13N, and then goes out at the air inlet 821. The noise cancellation engine 810 can be implemented with one of the ANC circuitry 400 and the noise cancellation engines 50 and 60. The noise cancellation engine 810 may be either a component separate from the main control circuit 12/12A/12B or integrated into the main control circuit 12/12A/12B. It is to be understood that FIGS. 4,6, and 8A illustrate the connection topology of the microphones 401~40S and the speakers 411~41U, not necessarily the physical arrangement of the microphones 401~40S and the speakers 411~41U. Neither the microphones 401~40S nor the speakers 411~41U are necessarily arranged in ascending/descending order. In a preferred embodiment, the s2 error microphones are disposed in proximity to the speakers 411~41U.

Figure 8B:
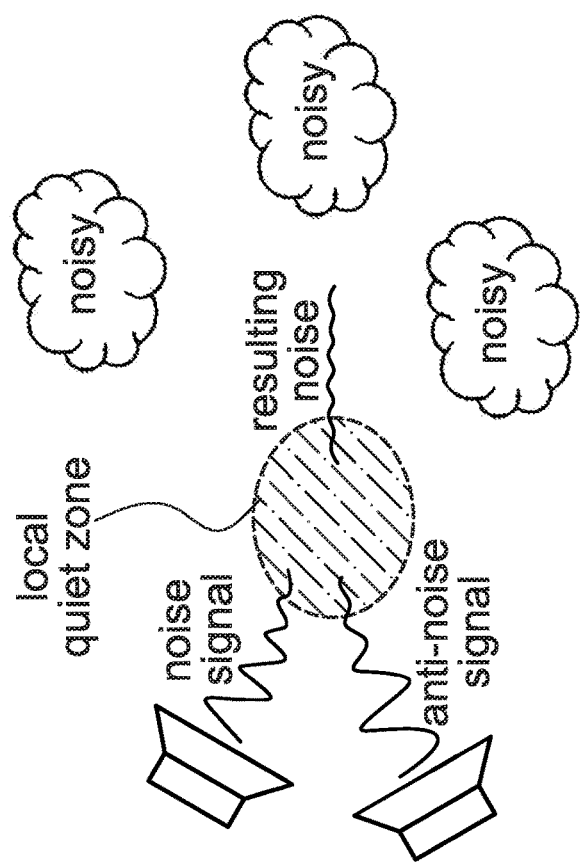
FIG. 8B is an exemplary diagram showing a local quiet zone is formed by a noise signal and an anti-noise signal from a conventional ANC circuitry (without any air duct).
Figure 8C:
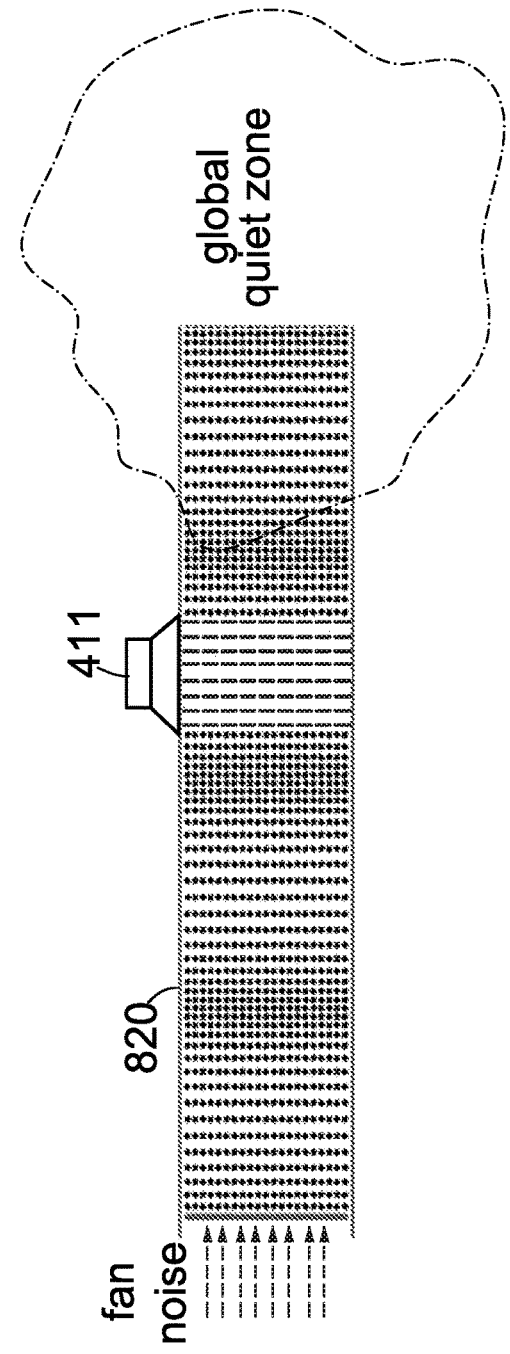
FIG. 8C shows a concept that a duct structure assists a noise signal in forming a plane wave and then the plane wave can be cancelled by the addition of an anti-noise signal in the air duct 820 to construct a global quiet zone on the right side of the speaker 411.

FIG. 8B is an exemplary diagram showing a local quiet zone is formed by a noise signal and an anti-noise signal from a conventional ANC circuitry (without any air duct). Referring to FIG. 8B, although the conventional ANC circuitry (without any air duct) can reduce the noise magnitude by the addition of an anti-noise signal, noise cancellation is only effective within a limited small area (i.e., a local quiet zone). On the other hand, as well known in the art, noise propagating in air ducts is divided into plane waves and higher-order modes. The plane waves propagate with the speed of sound in free space and are characterized by a uniform sound pressure distribution across the ducts. The higher-order modes propagate at speeds dependent on the sound frequency and the order of modes, and are characterized by a non-uniform sound pressure distribution across the ducts. For the noise cancellation engine 810, controlling the higher-order mode propagation is much harder than controlling the plane wave propagation. Fortunately, the higher-order modes do not propagate in ducts until the highest frequency of noise exceeds the cut-on frequency $f_{CO}$ for the first higher-order mode. In other words, if the highest frequency fs1 of noise is less than and equal to the cut-on frequency $f_{CO}$, the plane waves propagate in the air duct; if fs1>$f_{CO}$, the higher-order modes propagate in the air duct. Accordingly, if fs1<=$f_{CO}$, a plane wave can be cancelled by the addition of an anti-noise signal in the air duct 820 to construct a large quiet zone (i.e., a global quiet zone) on the right side of the speaker 411, inside or outside the duct 820, as shown in FIG. 8C. Although the highest frequency fs1 of fan noise in a notebook is to be measured, it is very likely to design the cross-section of the air duct 820 (will be described below) to increase the cut-on frequency $f_{CO}$ so that a significant attenuation in duct noise propagation can be achieved.

For the air duct 820 with a rectangular cross-section, the cut-on frequency for the first higher-order mode is given by $f_{CO}$=c0/(2×d), where d denotes the largest cross-sectional dimension and c0 is the speed of sound in free space. For example, if the air duct 820 has a rectangular cross-section, the temperature is 20° C. and its largest cross-sectional dimension is equal to 3 cm, the cut-on frequency $f_{CO}$ would be equal to 5.7 kHz. For the air duct 820 with a circular cross-section, the cut-on frequency is given by $f_{CO}$=0.586× c0/b, where b denotes the diameter of the circular cross-section. For the duct 820 with a regular-shape (other than rectangle and circle) cross-section, the cut-on frequency $f_{CO}$ is obtained by simulation and experimental measurements. The suitable materials for the air duct 820 include, without limitations, aluminum-magnesium alloy, and acrylonitrile butadiene styrene (ABS) plastics. The duct wall is rigid and the required thickness of the duct wall for good sound isolation is obtained by measurement in prototype experiments. The microphones 401~40S and the speakers 411~41U are all disposed beneath the inner surface/wall of the air duct 820 so that the inner surface/wall of the duct 820 is smooth without obstructing the air flow.

Figure 8E:
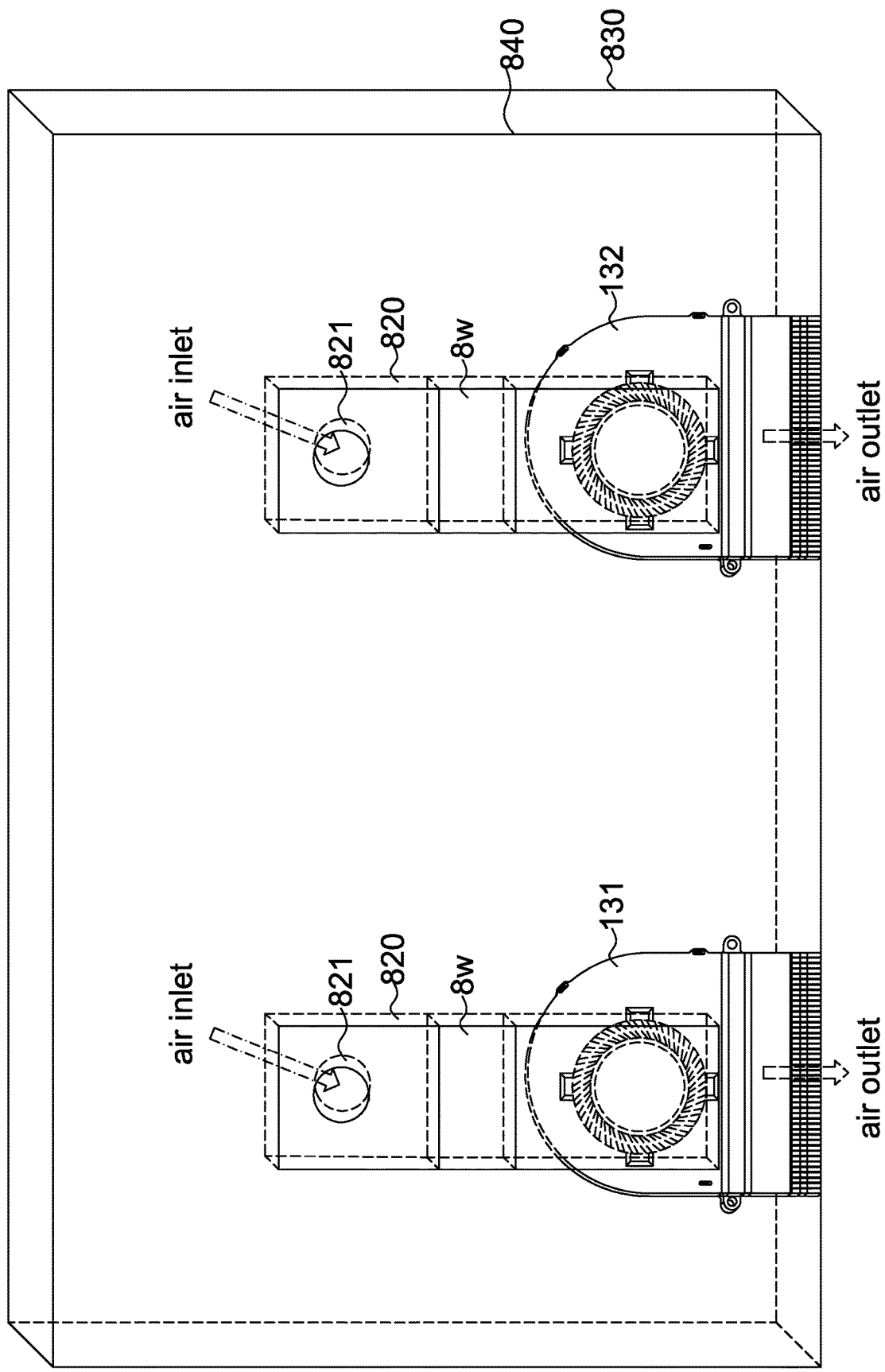
FIG. 8E is an exemplary diagram showing two separate ducts 820 for two fans 131~132 within the notebook related to FIG. 8D.
Figure 8F:
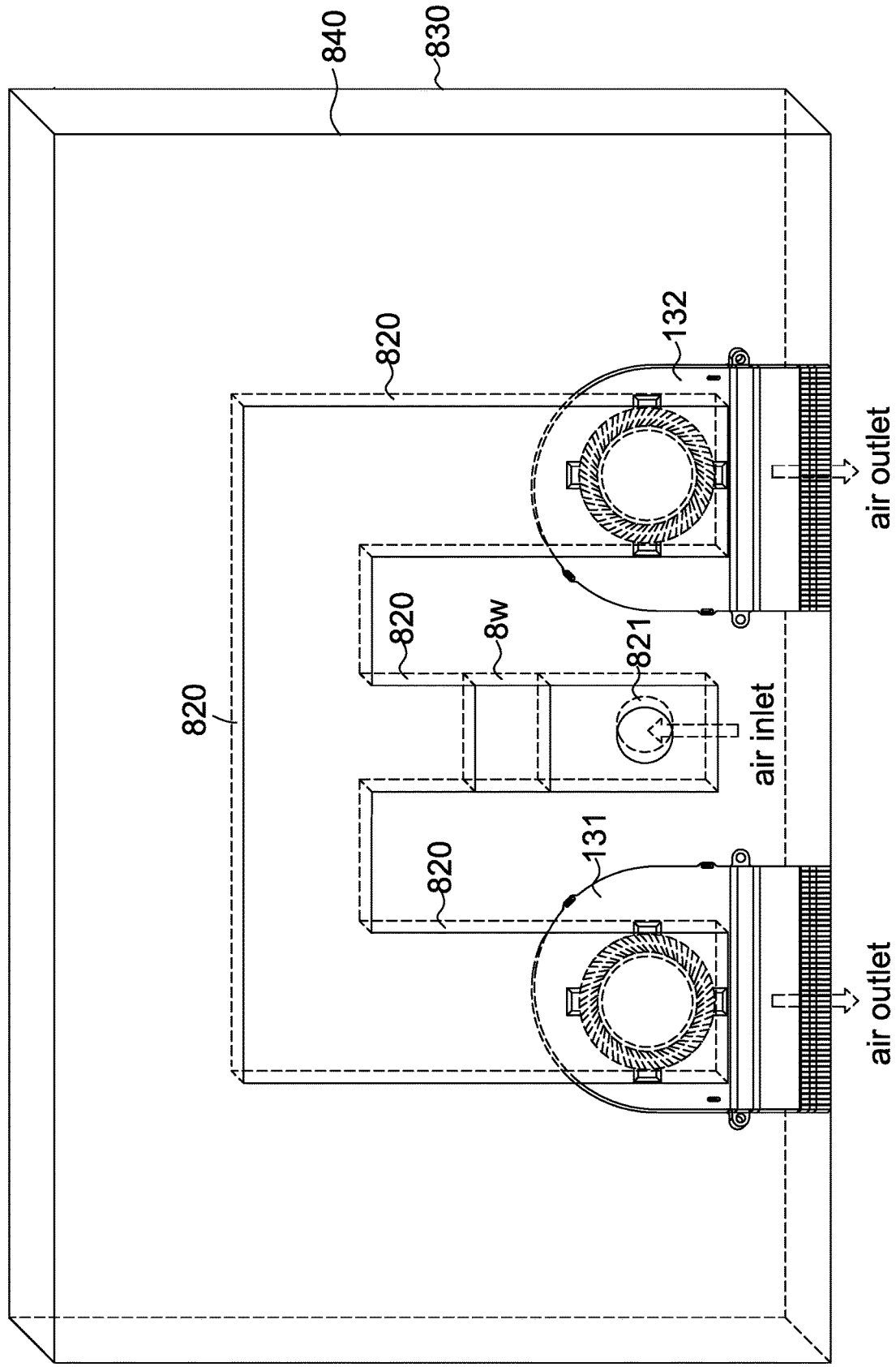
FIG. 8F is an exemplary diagram showing a single duct is shared by multiple fans within the notebook related to FIG. 8D.

FIG. 8D is an exemplary diagram showing the position relationship among the air duct 820, a fan 131, a noise cancellation engine 810, a reference microphone 401, an error microphone 402, and two speakers 411-412 within a notebook with s1=s2=1 and U=2. FIG. 8E is an exemplary diagram showing two separate ducts 820 for two fans 131~132 within the notebook related to FIG. 8D. Referring to FIGS. 8D-8E, the working block 8w, including microphones and speakers only, such as the reference microphone 401, the error microphone 402, and the speakers 411~412, is located in the middle of the duct 820, between the fans 131~13N and the air inlet 821. Please note that the noise cancellation engine 810 is not necessarily located adjacent to the working block 8w. The air duct 820 in FIGS. 8D-8F located inside the case 108 of the notebook (e.g., between the c side/shell 830 and the d side/shell 840) is provided by example, but not limitations of the invention. In an alternative embodiment, the air duct 820 may be located external to the case 108 of the notebook. FIG. 8F is an exemplary diagram showing a single duct is shared by multiple fans within the notebook related to FIG. 8D. In comparison with FIG. 8E, the example of FIG. 8F is more cost-effective because two or more fans share a common duct, a common working block 8w and a common noise cancellation engine 810.

The functionality of the main control circuits 12/12A/12B, the noise cancellation modules 15/15A/15B/15C/15D, and their respective components, as well as the methods step and blocks may be implemented by software, hardware, firmware, or a combination thereof. The software/firmware may be a program having sets of instructions executable by one or more digital circuits, such as CPUs, microprocessors, digital signal processors (DSPs), embedded controllers, or intellectual property (IP) cores. If implemented in software/firmware, the functions may be stored as instructions or code on one or more computer-readable media. Computer-readable medium includes computer storage medium, including any non-transitory medium that facilitates transfer of a computer program from one place to another. A storage medium may be any available medium that can be accessed by a computer. By way of example, and not limitation, such computer-readable medium can comprise RAM, ROM, EEPROM, CD-ROM and DVD-ROM disks, flash memory devices, magnetic disk storage devices, or any other medium that can be used to store desired program codes in the form of instructions or data structures and that can be accessed by a computer. Combinations of the above should also be included within the scope of computer-readable medium.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A fan control system applied to N fans inside a computer system, comprising:
   a main microphone for generating a main audio signal;
   a control circuitry coupled to the main microphone and configured to calculate a basic frequency value according to a temperature inside the computer system, and continuously update a parameter by a known optimization algorithm according to the main audio signal;
   a wave generation circuitry for generating N square waves according to the basic frequency value and the parameter; and
   a number N of fan controllers coupled between the wave generation circuitry and the N fans for forming and transmitting N modulation signals to the N fans according to the N square waves and N tachometric signals from the N fans;
   wherein the parameter is one of a frequency variation and a set of phase differences;
   wherein the N square waves have the same frequency; and
   wherein the known optimization algorithm is Gradient Descent.

2. The system according to claim 1, wherein the control circuitry is further configured to adjust the basic frequency value according to a number of poles in a motor of each of the N fans.

3. The system according to claim 1, wherein when the parameter is the set of phase differences, the wave generation circuitry comprises:
   a square wave generator for generating one of the N square waves according to the basic frequency value; and
   a number (N-1) of phase delay circuitry for respectively delaying the one of the N square waves according to the set of phase differences to generate the other (N-1) square waves so that the N square waves have different phases, wherein the set of phase differences comprises (N-1) phase differences and N>=2.

4. The system according to claim 1, wherein when the parameter is the frequency variation, the wave generation circuitry comprises:
   a triangular wave generator for generating a triangular wave with an average equal to the basic frequency value and an amplitude equal to the frequency variation; and
   a square wave generator for generating a square wave signal as the N square waves according to frequency values on the triangular wave, where N>=1.

5. The system according to claim 1, wherein a total fan acoustic noise power picked up by the main microphone is a function of the parameter, and wherein the control circuitry is further configured to use the known optimization algorithm to continuously adjust the parameter and calculate a corresponding total fan acoustic noise power so as to find an optimal parameter corresponding to a minimum of the total fan acoustic noise power at runtime.

6. The system according to claim 1, further comprising:
   Q noise cancellation systems, each noise cancellation system comprising:
      a number s1 of reference microphones in proximity to the N fans for generating s1 reference signals;
      a number U of speakers for converting a number U of anti-noise signals into a number U of sound pressure signals;
      a number s2 of error microphones in proximity to the number U of speakers for generating s2 error signals, where each of parameters s1, s2, U is greater than or equal to 1; and
      a noise cancellation engine for receiving the s1 reference signals and the s2 error signals to generate the number U of anti-noise signals, where Q>=1.

7. The system according to claim 6, wherein the noise cancellation engine comprises:
   a number U of first adaptive filters with a known adaptive algorithm, configured to perform adaptive filtering operations over the s1 reference signals and the s2 error signals to generate the number U of anti-noise signals according to the known adaptive algorithm;
   wherein the known adaptive algorithm is a least mean square algorithm.

8. The system according to claim 6, wherein the noise cancellation engine comprises:
   an integer-M phase-locked loop circuit for receiving one of the N tachometric signals to generate a first sampling clock;
   wherein a frequency of the first sampling clock is related to a fixed degree of rotation of the N fans and M is related to a number of poles in a motor of each of the N fans.

9. The system according to claim 8, wherein the noise cancellation engine further comprises:
   a first interpolator for performing interpolation over values of multiple first sample points in a first sequence related to a corresponding reference microphone and a second sampling clock to generate a value of a second sample point in a second sequence related to the first sampling clock, wherein the multiple first sample points are related to the second sample point in time axis;
   a memory device for storing multiple averaged sample values for multiple predefined degrees of rotation in one rotation of the N fans based on the first sampling clock;
   an average unit for performing average operation over the value of the second sample point and a corresponding averaged sample value of a previous rotation from the memory device to store an averaged sample value of a current rotation back to the memory device for each predefined degree of rotation;
   a second interpolator for performing interpolation over a predefined number of the averaged sample values from the memory device according to the first sampling clock to generate a value of a third sample point in a third sequence related to the second sampling clock, wherein the predefined number of the averaged sample values are related to the third sample point in time axis; and
   a first active noise cancellation (ANC) circuitry comprising a second adaptive filter with a known adaptive algorithm and configured to perform adaptive filtering operations over the third sequence and one error signal from a corresponding error microphone to generate one anti-noise signal according to the known adaptive algorithm;

wherein a frequency of the second sampling clock is related to a fixed time interval;

wherein s1=s2=U=1; and wherein the known adaptive algorithm is a least mean square algorithm.

10. The system according to claim 8, wherein the noise cancellation engine further comprises:

a number (s1+s2) of first interpolators, each performing interpolation over values of multiple first sample points in a first sequence derived from a corresponding microphone and related to a second sampling clock to generate a value of a second sample point in a second sequence related to the first sampling clock, wherein the multiple first sample points are related to the second sample point in time axis;

a second ANC circuitry for performing operations over a number (s1+s2) of second sequences to generate a number U of third sequences; and a number U of second interpolators, each performing interpolation over values of multiple third sample points in a corresponding third sequence according to the first sampling clock to generate a value of a fourth sample point in a fourth sequence related to the second sampling clock, wherein the multiple third sample points are related to the fourth sample point in time axis;

wherein a frequency of the second sampling clock is related to a fixed time.

11. The system according to claim 10, wherein the second ANC circuitry comprises a number U of third adaptive filters with a known adaptive algorithm, wherein the number U of third adaptive filters are configured to perform adaptive filtering operations over the (s1+s2) second sequences to generate the number U of third sequences according to the known adaptive algorithm, and wherein the known adaptive algorithm is a least mean square algorithm.

12. The system according to claim 10, wherein the second ANC circuitry comprises:

a transform circuit for respectively transforming values of multiple second sample points in current frames of the number (s1+s2) of second sequences into a number (s1+s2) of spectral representations;

at least one processor coupled to the transform circuit; and a storage media including instructions operable to be executed by the at least one processor to perform operations comprising:

performing ANC operations over the values of the multiple second sample points in the current frames of the number (s1+s2) of second sequences and the number (s1+s2) of spectral representations using a neural network based on the first sampling clock to generate the number U of third sequences.

13. The system according to claim 12, wherein the neural network is selected from the group comprising a deep neural network (DNN), a convolutional neural network (CNN), a recurrent neural network (RNN), a time delay neural network (TDNN) and a combination thereof.

14. The system according to claim 12, wherein the second ANC circuitry further comprises:

a number U of multipliers coupled between the at least one processor and the number U of second interpolators, each sequentially multiplying a value of each third sample point of a corresponding third sequence by an ANC weight to generate a corresponding product value.

15. The system according to claim 6, further comprising:

an air duct having an air inlet and coupled to two or more of the N fans, wherein the s1 reference microphones, the s2 error microphones and the U speakers are located between the air inlet and the two or more of the N fans, where Q=1.

16. The system according to claim 15, wherein a quiet zone is formed at one end of the air duct opposite to the two or more of the N fans when highest frequencies of the s1 reference signals are less than a cut-on frequency for a first higher-order mode contained in the s1 reference signals.

17. The system according to claim 15, wherein a material of the air duct is selected from the group comprising aluminum-magnesium alloy and acrylonitrile butadiene styrene plastics.

18. The system according to claim 6, wherein each noise cancellation system further comprises:

an air duct having an air inlet and coupled to a corresponding fan, wherein the s1 reference microphones, the s2 error microphones and the U speakers are located between the air inlet and the corresponding fan, where Q=N.

19. The system according to claim 18, wherein a quiet zone is formed at one end of the air duct opposite to the corresponding fan when highest frequencies of the s1 reference signals are less than a cut-on frequency for a first higher-order mode contained in the s1 reference signals.

20. The system according to claim 19, wherein the cut-on frequency is related to a cross-section of the air duct.

21. A fan control method, applied to N fans inside a computer system, comprising:

calculating a basic frequency value according to a temperature inside the computer system;

continuously updating a parameter by a known optimization algorithm according to a main audio signal from a main microphone;

generating N square waves according to the basic frequency value and the parameter; and forming and transmitting N modulation signals to the N fans according to the N square waves and N tachometric signals from the N fans;

wherein the parameter is one of a frequency variation and a set of phase differences;

wherein the N square waves have the same frequency; and wherein the known optimization algorithm is Gradient Descent.

22. The method according to claim 21, wherein the step of calculating further comprises:

adjusting the basic frequency value according to a number of poles in a motor of each of the N fans.

23. The method according to claim 21, wherein when the parameter is the set of phase differences, the step of generating comprises:

generating one of the N square waves according to the basic frequency value by a square wave generator; and respectively delaying the one of the N square waves according to the set of phase differences to generate the other (N-1) square waves so that the N square waves have different phases;

wherein the set of phase differences comprises (N-1) phase differences and N>=2.

24. The method according to claim 21, wherein when the parameter is the frequency variation, the step of generating comprises:

generating a triangular wave with an average equal to the basic frequency value and an amplitude equal to the frequency variation by a triangular wave generator; and generating a square wave signal as the N square waves according to frequency values on the triangular wave by a square wave generator, where N>=1.

25. The method according to claim 21, wherein the step of continuously updating comprises:

using the known optimization algorithm to continuously adjust the parameter and calculate a corresponding total fan acoustic noise power so as to find an optimal parameter corresponding to a minimum of a total fan acoustic noise power picked up by the main microphone at runtime;

wherein the total fan acoustic noise power picked up by the main microphone is a function of the parameter.

26. The method according to claim 21, further comprising:

obtaining s1 reference signals from a number s1 of reference microphones in proximity to the N fans;

obtaining s2 error signals from a number s2 of error microphones in proximity to a number U of speakers;

generating a number U of anti-noise signals according to the s1 reference signals and the s2 error signals; and converting the number U of anti-noise signals into a number U of sound pressure signals by the number U of speakers, where each parameter s1, s2, U is greater than or equal to 1.

27. The method according to claim 26, wherein the step of generating the number U of anti-noise signals comprises:

performing adaptive filtering operations over the s1 reference signals and the s2 error signals according to a known adaptive algorithm to generate the number U of anti-noise signals;

wherein the known adaptive algorithm is a least mean square algorithm.

28. The method according to claim 26, wherein the step of generating the number U of anti-noise signals comprises:

generating a first sampling clock according to one of the N tachometric signals by an integer-M phase-locked loop circuit;

wherein a frequency of the first sampling clock is related to a fixed degree of rotation of the N fans and M is related to a number of poles in a motor of each of the N fans.

29. The method according to claim 28, wherein the step of generating the number U of anti-noise signals further comprises:

performing first interpolation over values of multiple first sample points in a first sequence related to a corresponding reference microphone and a second sampling clock to generate a value of a second sample point in a second sequence related to the first sampling clock, wherein the multiple first sample points are related to the second sample point in time axis;

storing multiple averaged sample values for multiple predefined degrees of rotation in one rotation into a memory device based on the first sampling clock;

performing average operation over the value of the second sample point and a corresponding averaged sample value of a previous rotation from the memory device to store an averaged sample value of a current rotation back to the memory device for each predefined degree of rotation;

performing second interpolation over a predefined number of the averaged sample values in the memory device according to the first sampling clock to generate a value of a third sample point in a third sequence related to the second sampling clock, wherein the predefined number of the averaged sample values are related to the third sample point in time axis; and performing an adaptive filtering operation over the third sequence and one error signal from a corresponding error microphone based on a known adaptive algorithm to generate one anti-noise signal;

wherein a frequency of the second sampling clock is related to a fixed time interval;

wherein s1=s2=U=1; and wherein the known adaptive algorithm is a least mean square algorithm.

30. The method according to claim 28, wherein the step of generating the number U of anti-noise signals further comprises:

performing interpolation over values of multiple first sample points in each of first sequences derived from the reference and the error microphones and related to a second sampling clock to generate a value of a second sample point in a second sequence related to the first sampling clock, wherein the multiple first sample points are related to the second sample point in time axis;

performing ANC operations over a number (s1+s2) of second sequences to generate a number U of third sequences;

performing interpolation over values of multiple third sample points in each third sequence according to the first sampling clock to generate a value of a fourth sample point in a fourth sequence related to the second sampling clock, wherein the multiple third sample points are related to the fourth sample point in time axis;

wherein a frequency of the second sampling clock is related to a fixed time.

31. The method according to claim 30, wherein the step of performing the ANC operations comprises:

performing adaptive filtering operations over the number (s1+s2) of second sequences according to a known adaptive algorithm to generate the number U of third sequences; wherein the known adaptive algorithm is a least mean square algorithm.

32. The method according to claim 30, wherein the step of performing the ANC operations comprises:

respectively transforming values of multiple second sample points in current frames of the number (s1+s2) of second sequences into a number (s1+s2) of spectral representations; and performing the ANC operations over the values of the multiple second sample points in the current frames and the number (s1+s2) of spectral representations using a neural network based on the first sampling clock to generate the number U of third sequences.

33. The method according to claim 32, wherein the neural network is selected from the group comprising a deep neural network (DNN), a convolutional neural network (CNN), a recurrent neural network (RNN), a time delay neural network (TDNN) and a combination thereof.

34. The method according to claim 32, wherein the step of performing the ANC operations further comprises:

sequentially multiplying each third sample value in each third sequence by an ANC weight to generate a corresponding multiplied sample value.

35. The method according to claim 26, further comprising:

coupling an air duct having an air inlet to two or more of the N fans; and disposing the number s1 of reference microphones, the number s2 of error microphones and the number U of speakers between the air inlet and the two or more of the N fans.

36. The method according to claim 35, wherein a quiet zone is formed at one end of the air duct opposite to the two or more of the N fans when highest frequencies of the s1 reference signals are less than a cut-on frequency for a first higher-order mode contained in the s1 reference signals.

37. The method according to claim 36, wherein the cut-on frequency is related to a cross-section of the air duct.

38. The method according to claim 21, further comprising:

for a fan (i) of the N fans, obtaining s1 reference signals from a number s1 of reference microphones in proximity to the fan(i);

obtaining s2 error signals from a number s2 of error microphones in proximity to a number U of speakers;

generating a number U of anti-noise signals according to the s1 reference signals and the s2 error signals;

converting the number U of anti-noise signals into a number U of sound pressure signals by the number U of speakers, where each parameter s1, s2, U is greater than or equal to 1;

coupling an air duct having an air inlet to the fan(i); and disposing the number s1 of reference microphones, the number s2 of error microphones and the number U of speakers between the air inlet and the fan(i), where $1<=i<=N$.

39. The method according to claim 38, wherein the step of generating the number U of anti-noise signals comprises:

performing adaptive filtering operations over the s1 reference signals and the s2 error signals according to a known adaptive algorithm to generate the number U of anti-noise signals;

wherein the known adaptive algorithm is a least mean square algorithm.

* * * * *